United States Patent
Payne

(10) Patent No.: US 8,131,612 B1
(45) Date of Patent: Mar. 6, 2012

(54) PROGRAM GENERATOR FOR HEDGING THE GUARANTEED BENEFITS OF A SET OF VARIABLE ANNUITY CONTRACTS

(75) Inventor: Richard C. Payne, Mississauga (CA)

(73) Assignee: Genesis Financial Products, Inc., Mississauga, Ontario (CA)

( * ) Notice: Subject to any disclaimer, the term of this patent is extended or adjusted under 35 U.S.C. 154(b) by 829 days.

(21) Appl. No.: 11/124,666

(22) Filed: May 9, 2005

(51) Int. Cl.
*G06Q 40/00* (2012.01)

(52) U.S. Cl. ............................ 705/35; 705/36 R; 705/37

(58) Field of Classification Search .................... 705/35, 705/36 R, 36 T, 37, 38, 39
See application file for complete search history.

(56) References Cited

U.S. PATENT DOCUMENTS

| | | | | |
|---|---|---|---|---|
| 6,006,033 | A * | 12/1999 | Heisch | 717/158 |
| 6,049,772 | A * | 4/2000 | Payne et al. | 705/4 |
| 6,064,985 | A * | 5/2000 | Anderson | 705/36 R |
| 6,125,355 | A * | 9/2000 | Bekaert et al. | 705/36 R |
| 6,701,359 | B1 * | 3/2004 | Calabrez et al. | 709/223 |
| 6,850,947 | B1 * | 2/2005 | Lim et al. | 707/101 |
| 7,716,075 | B1 * | 5/2010 | Payne | 705/4 |
| 7,895,111 | B2 * | 2/2011 | Mocciolo | 705/36 R |
| 2002/0174006 | A1 * | 11/2002 | Rugge et al. | 705/10 |
| 2003/0033229 | A1 * | 2/2003 | Keyes et al. | 705/36 |
| 2003/0088444 | A1 * | 5/2003 | Garbin et al. | 705/4 |
| 2003/0105696 | A1 * | 6/2003 | Kalotay et al. | 705/35 |
| 2003/0115128 | A1 * | 6/2003 | Lange et al. | 705/37 |
| 2003/0144980 | A1 * | 7/2003 | Holmgren | 707/1 |
| 2004/0044988 | A1 * | 3/2004 | Schene | 717/106 |
| 2005/0027645 | A1 * | 2/2005 | Lui et al. | 705/38 |
| 2005/0209959 | A1 * | 9/2005 | Tenney | 705/39 |
| 2006/0047588 | A1 * | 3/2006 | Lal et al. | 705/30 |
| 2006/0136921 | A1 * | 6/2006 | Becker et al. | 718/100 |
| 2006/0206398 | A1 * | 9/2006 | Coughlin | 705/35 |
| 2007/0162380 | A1 * | 7/2007 | Conroy | 705/38 |
| 2010/0262565 | A1 * | 10/2010 | Gastineau et al. | 705/36 R |

FOREIGN PATENT DOCUMENTS

| | | | |
|---|---|---|---|
| WO | WO-00/13118 | * | 3/2000 |
| WO | WO 01/50381 | * | 7/2001 |
| WO | WO 2006/076622 A2 | * | 7/2006 |

OTHER PUBLICATIONS

Multi-Threaded Vectorization, T. Chiueh, ACM 1991.*

(Continued)

*Primary Examiner* — Narayanswamy Subramanian
*Assistant Examiner* — Ed Baird
(74) *Attorney, Agent, or Firm* — Simpson & Simpson, PLLC

(57) ABSTRACT

A computer-based method for generating a program for hedging guaranteed benefits of a set of variable annuity (VA) contracts, including automatically generating interpreted and compiled contract value projection code; generating vectorized integrated scenario sets including arbitrage-free interest rate, hedging instrument, and VA fund values based on financial market data and regression and cointegration analysis of the VA funds and user-selected hedging instruments; multi-threaded vectorized calculating of present value $PVG_{ij}$ of projected VA benefit guarantee cash flows for each VA contract i for each vectorized integrated scenario set j; calculating of differences of $PVG_{ij}$ to determine sensitivities to financial parameters ("Greeks") for each contract; calculating of present value $PVA_{ij}$ of projected asset cash flows for each asset i for each vectorized integrated scenario set j; calculating of differences of $PVA_{ij}$ to determine sensitivities to financial parameters ("Greeks") for each asset; and, presenting of summary and detail asset and liability Greeks.

4 Claims, 4 Drawing Sheets

OTHER PUBLICATIONS

Shim et al: "Schaum's outline of theory and problems of managerial accounting" Business & Economics—1998.*
Goetz: "Java theory and practice: Concurrent collections classes—ConcurrentHashMap and CopyOnWriteArrayList offer thread safety and improved scalability"; Jul. 23, 2003.*
Downes et al: "Dictionary of Finance and Investment Terms", Barron's Educational Series, Inc., Copyright 1998, p. 27-28.*
Martin Baxter and Andrew Rennie, Financial Calculus, pp. 183-188, (1996).
Alan Brace, Dariusz Gatarek, and Marek Musiela, The Market Model of Interest Rate Dynamics, (Mathematical Finance, vol. 7, No. 2) pp. 127-155, (1997).
Paul Glasserman and Xiaoliang Zhao, Arbitrage-Free Discretization of Lognormal Forward Libor and Swap Rate Models, (Finance Stochast. 4, pp. 35-68) (2000).
Damiano Brigo and Fabio Mercurio, Interest Rate Models Theory and Practice, pp. 220-249, (2001).
C. J. Hunter, P. Jackel, and M.S. Joshi, Drift Approximations in a Forward-Rate-Based LIBOR Market Model, pp. 1-10, (2001).
Riccardo Rebonato, Modern Pricing of Interest-Rate Derivatives, pp. 3-24, (2002).
Brian D. Ripley, Stochastic Simulation, pp. 82-87, (1987).
Robert Sedgewick, Algorithms, pp. 158-163, (1983).
Rick Booth, Inner Loops, pp. 235-236, (1997).
Scott Kirkpatrick and Erich P. Stoll, A Very Fast Shift-Register Sequence Random Number Generator, (Journal of Computational Physics, 40, pp. 517-526), (1981).
Gene H. Golub and Charles F. Van Loan, Matrix Computations, pp. 70-75 and 128-132, (1989).
Germund Dahlquist and Ake Bjorck, Numerical Methods, pp. 165-167 and 131-134, (1974).
Timothy Budd, an Introduction to Object-Oriented Programming, pp. 1-25 and 195-211, (1997).
Edward Yourdon and Larry L. Constantine, Structured Design, pp. 43-46, (1979).
Salih N. Neftci, An Introduction to the Mathematics of Financial Derivatives, pp. 312-342, (1996).
Carol Alexander, Market Models, pp. 347-387, (2002).
G. W. Stewart, an Updating Algorithm for Subspace Tracking, (IEEE Transaction or Signal Processing, vol. 40, No. 6), pp. 1535-1541, (1992).
Marek Musiela and Marek Rutkowski, Martingdale Methods in Financial Modelling, pp. 325-356, (1998).
Thomas A. Standish, Data Structure Techniques, pp. 141-145, (1941).
Thomas H. Cormen, Charles E. Leiserson, Ronald L. Rivest, and Clifford Stein, Introduction to Algorithms, pp. 232-237, (2001).
Intel Corporation 80386 Programmer's Reference Manual, pp. 3-1-3-39.
Johnson M. Hart, Windows System Programming, pp. 165-171, (2005).
Microsoft Win 32 Online Help, pp. 1-6.
Alan Brace, Marek Musiela, and Erik Schlogl, A Simulation Algorithm Based on Measure Relationships in the Lognormal Market Models, pp. 1-13, (1998).
Farshid Jamshidian, Liibor and Swap Market Models and Measures, (Finance Stochast. 1, pp. 293-330), 1997.

* cited by examiner

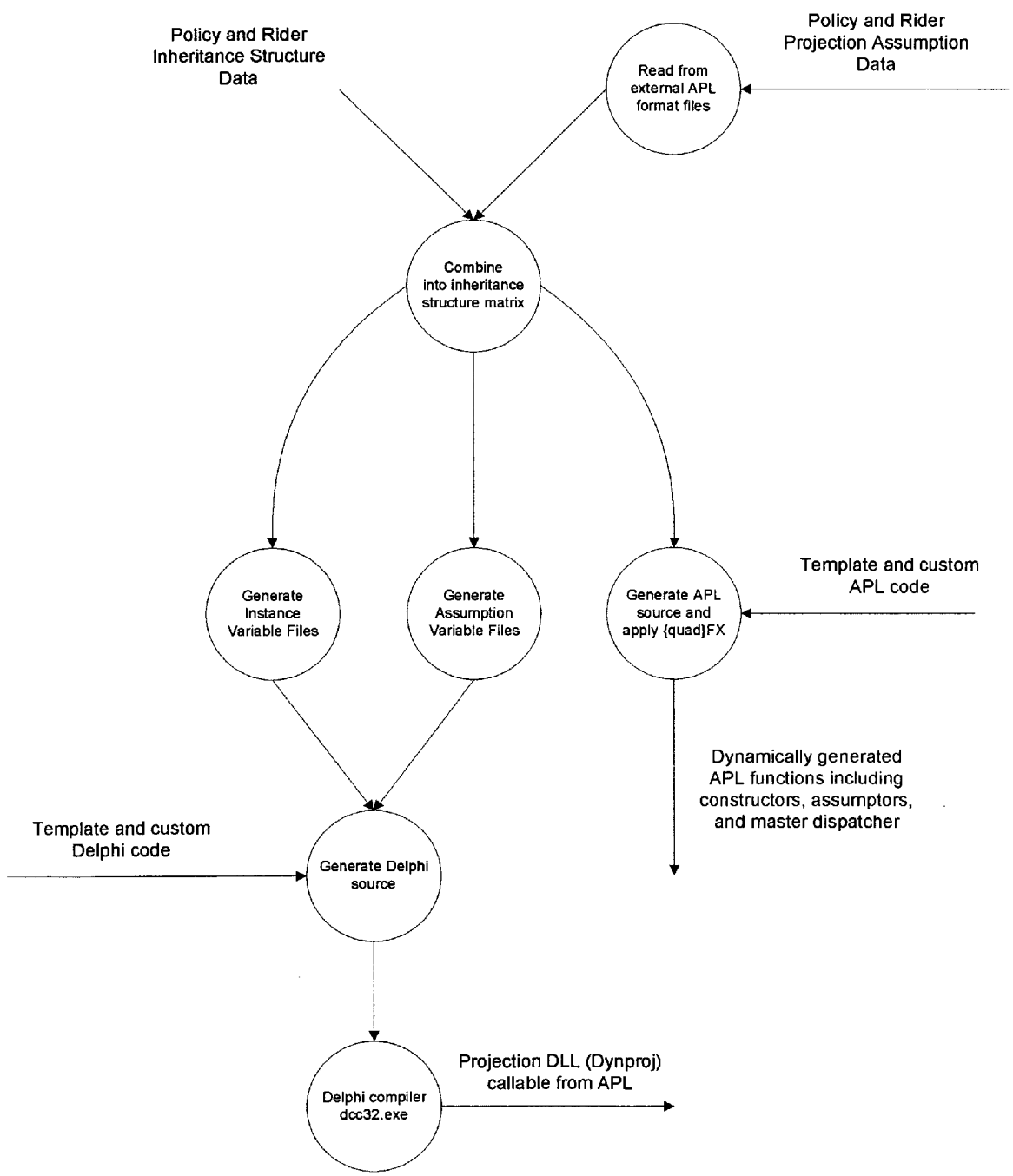
Figure 1: Code Generation

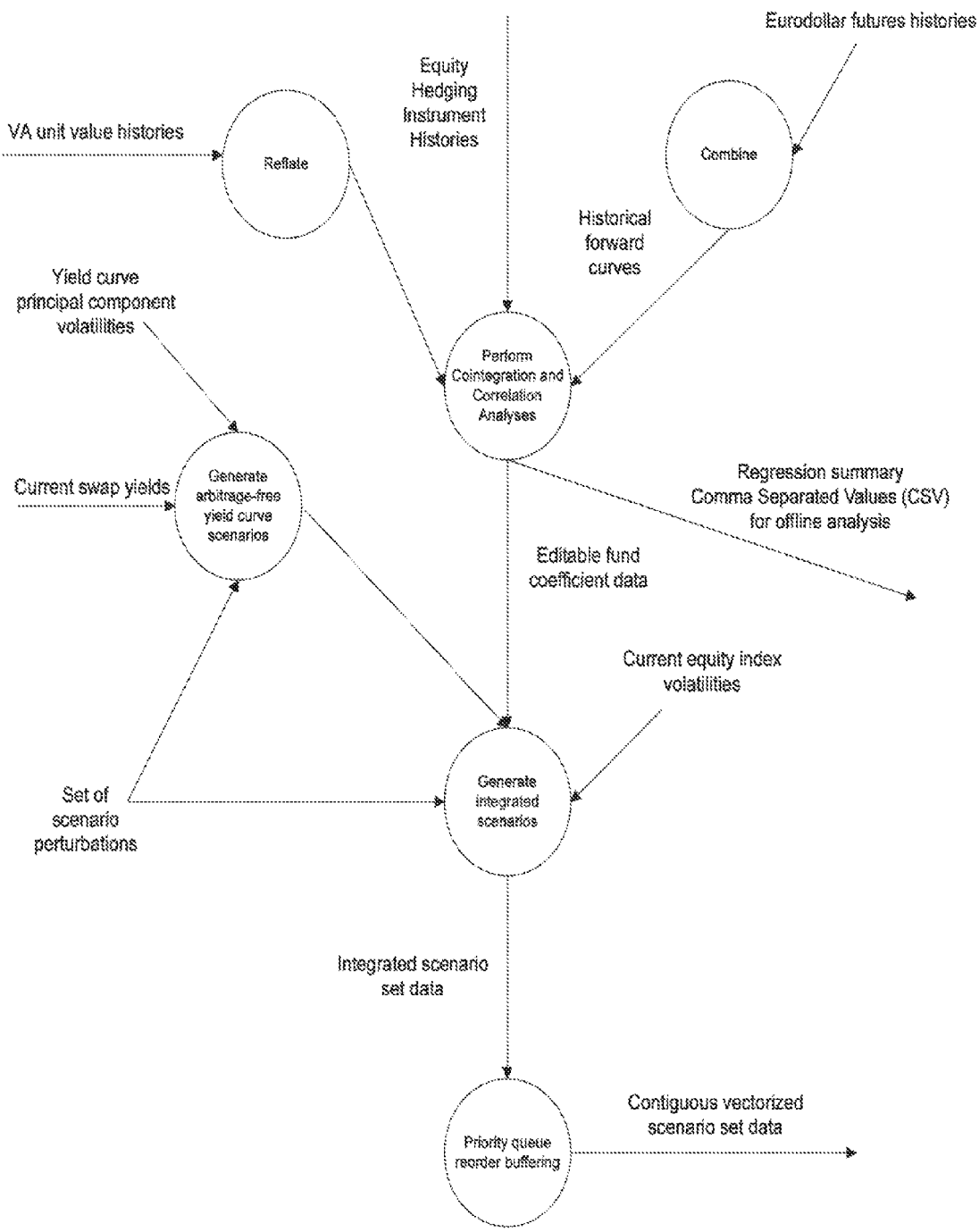
Figure 2: Scenario Set Generation

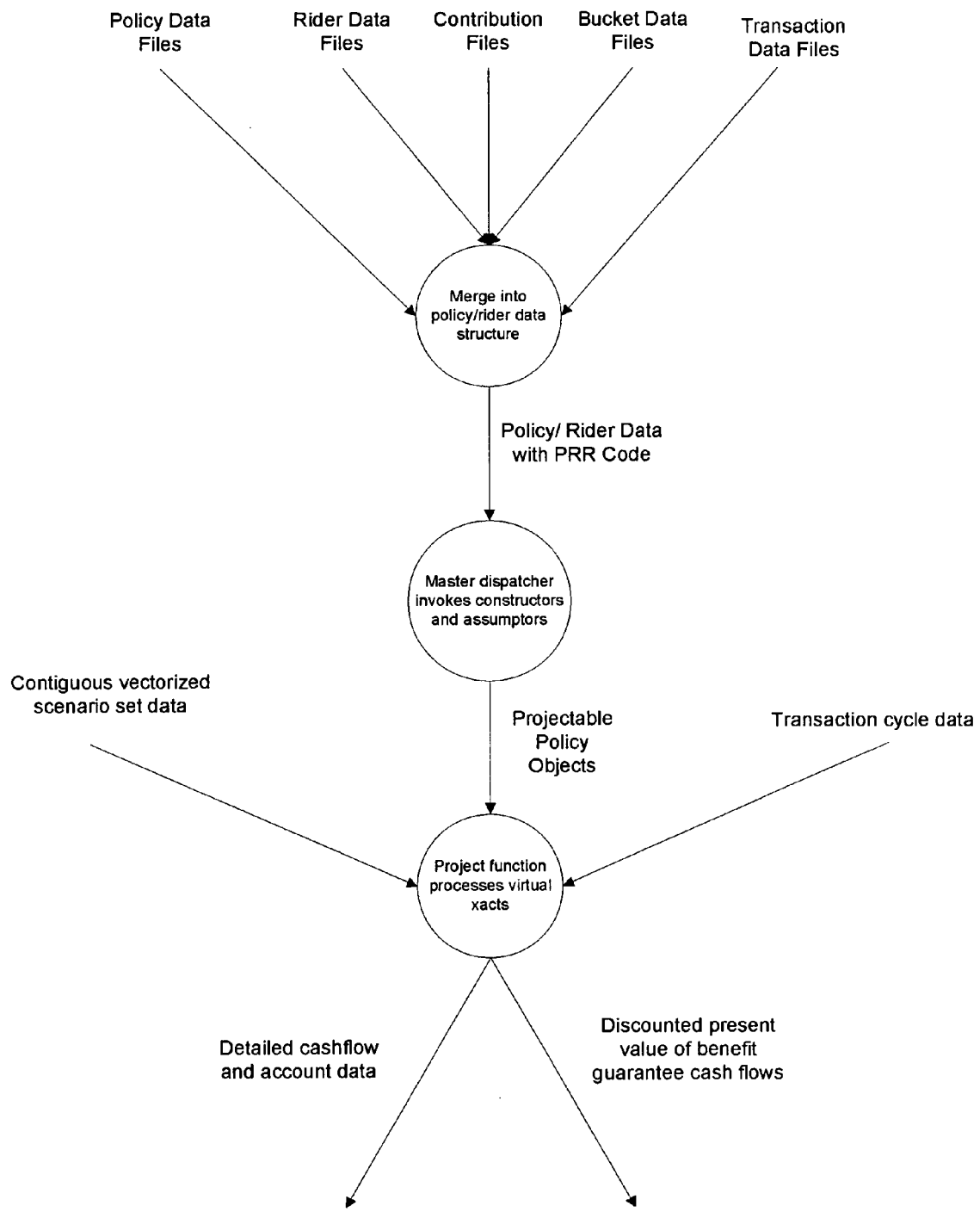
Figure 3: Value Projection

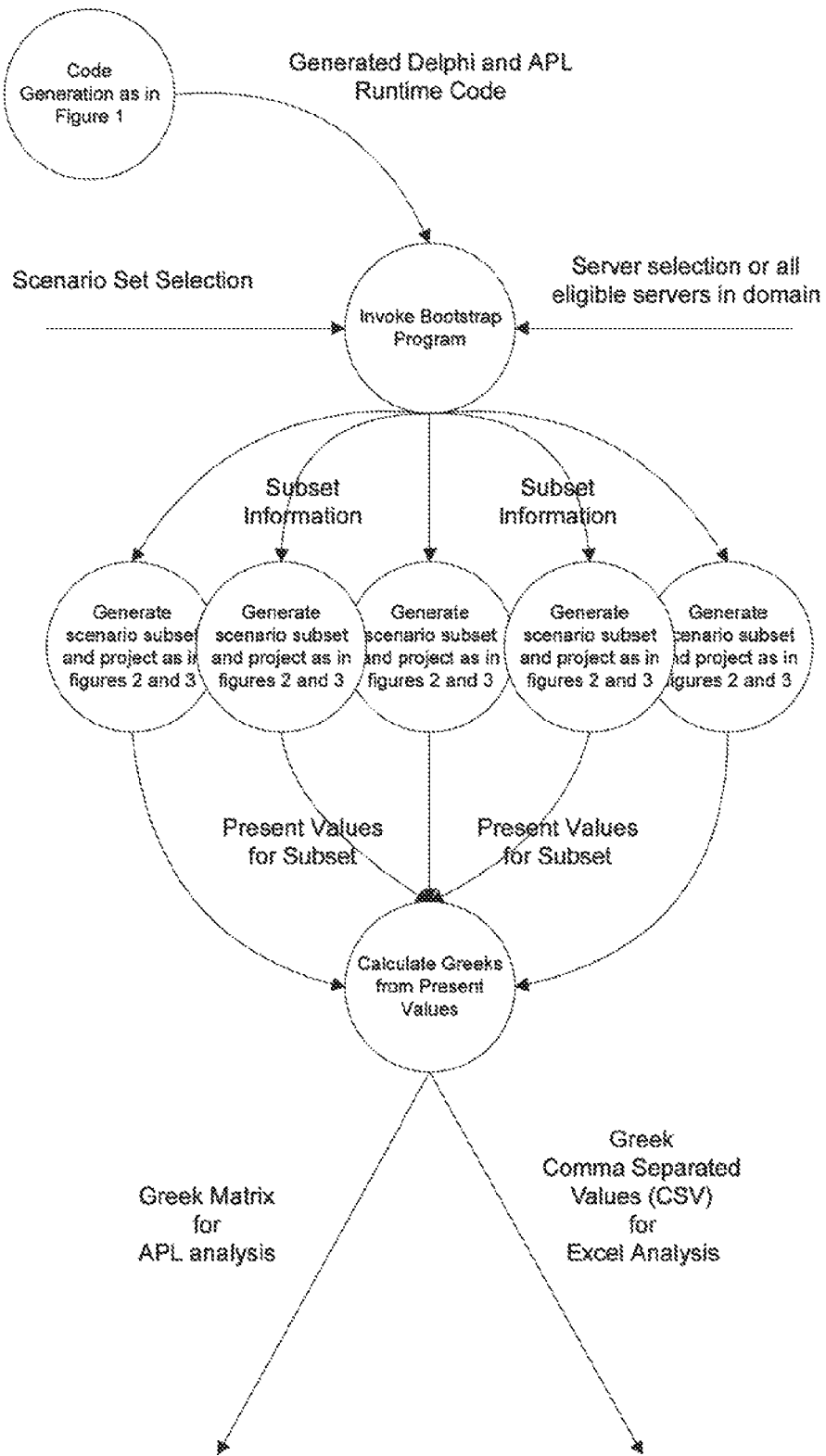
Figure 4: Distributed Processing

PROGRAM GENERATOR FOR HEDGING THE GUARANTEED BENEFITS OF A SET OF VARIABLE ANNUITY CONTRACTS

REFERENCE TO COMPUTER PROGRAM LISTING APPENDIX

The present application includes a computer program listing appendix on compact disc. Two duplicate compact discs are provided herewith. Each compact disc contains an ASCII text file of the computer program listing as follows:

| Name | Size | Created |
| --- | --- | --- |
| aplwrap2.dpr | 0 KB | 05/03/2005 10:27:02 AM |
| ASCII APL.txt | 903 KB | 05/03/2005 11:24:17 AM |
| atreg2.dpr | 24 KB | 05/03/2005 10:27:03 AM |
| combo.p11 | 1 KB | 05/03/2005 11:09:34 AM |
| combo.p12 | 0 KB | 05/03/2005 11:23:07 AM |
| combo_10_20.pas | 4 KB | 05/03/2005 11:10:38 AM |
| combo_10_20.src | 1 KB | 05/03/2005 10:27:28 AM |
| combo_10_20_30.pas | 2 KB | 05/03/2005 11:10:39 AM |
| combo_10_20_30.src | 0 KB | 05/03/2005 10:27:29 AM |
| combo_10_20_40.pas | 5 KB | 05/03/2005 11:10:40 AM |
| combo_10_20_40.src | 2 KB | 05/03/2005 10:27:30 AM |
| combo_10_20_40_60.pas | 3 KB | 05/03/2005 11:10:42 AM |
| combo_10_20_40_60.src | 1 KB | 05/03/2005 10:27:32 AM |
| combo_10_30.pas | 5 KB | 05/03/2005 11:10:43 AM |
| combo_10_30.src | 2 KB | 05/03/2005 10:27:33 AM |
| combo_10_30_40.pas | 6 KB | 05/03/2005 11:10:45 AM |
| combo_10_30_40.src | 3 KB | 05/03/2005 10:27:34 AM |
| combo_10_40.pas | 4 KB | 05/03/2005 11:10:46 AM |
| combo_10_40.src | 1 KB | 05/03/2005 10:27:35 AM |
| combo_10_50.pas | 1 KB | 05/03/2005 11:10:47 AM |
| combo_10_50.src | 0 KB | 05/03/2005 10:27:36 AM |
| combo_10_60.pas | 2 KB | 05/03/2005 11:10:48 AM |
| combo_10_60.src | 0 KB | 05/03/2005 10:27:38 AM |
| combo_20_10.pas | 15 KB | 05/03/2005 11:10:50 AM |
| combo_20_10.src | 10 KB | 05/03/2005 10:27:39 AM |
| combo_20_10_20_40.pas | 9 KB | 05/03/2005 11:10:51 AM |
| combo_20_10_20_40.src | 4 KB | 05/03/2005 10:27:40 AM |
| combo_20_10_20_40_60.pas | 3 KB | 05/03/2005 11:10:52 AM |
| combo_20_10_20_40_60.src | 1 KB | 05/03/2005 10:27:41 AM |
| combo_20_10_40.pas | 8 KB | 05/03/2005 11:10:54 AM |
| combo_20_10_40.src | 4 KB | 05/03/2005 10:27:42 AM |
| combo_20_15.pas | 9 KB | 05/03/2005 11:10:54 AM |
| combo_20_15.src | 6 KB | 05/03/2005 10:27:43 AM |
| combo_20_15_20.pas | 8 KB | 05/03/2005 11:10:55 AM |
| combo_20_15_20.src | 4 KB | 05/03/2005 10:27:44 AM |
| combo_20_15_20_40.pas | 9 KB | 05/03/2005 11:10:56 AM |
| combo_20_15_20_40.src | 4 KB | 05/03/2005 10:27:45 AM |
| combo_20_15_20_40_60.pas | 3 KB | 05/03/2005 11:10:57 AM |
| combo_20_15_20_40_60.src | 1 KB | 05/03/2005 10:27:45 AM |
| combo_20_15_30.pas | 9 KB | 05/03/2005 11:10:58 AM |
| combo_20_15_30.src | 5 KB | 05/03/2005 10:27:46 AM |
| combo_20_15_30_40.pas | 10 KB | 05/03/2005 11:10:59 AM |
| combo_20_15_30_40.src | 5 KB | 05/03/2005 10:27:47 AM |
| combo_20_15_30_40_60.pas | 3 KB | 05/03/2005 11:11:00 AM |
| combo_20_15_30_40_60.src | 1 KB | 05/03/2005 10:27:48 AM |
| combo_20_15_40.pas | 8 KB | 05/03/2005 11:11:01 AM |
| combo_20_15_40.src | 4 KB | 05/03/2005 10:27:49 AM |
| combo_20_20.pas | 1 KB | 05/03/2005 11:11:01 AM |
| combo_20_20.src | 0 KB | 05/03/2005 10:27:50 AM |
| combo_20_20_40.pas | 1 KB | 05/03/2005 11:11:02 AM |
| combo_20_20_40.src | 0 KB | 05/03/2005 10:27:51 AM |
| combo_20_30.pas | 1 KB | 05/03/2005 11:11:03 AM |
| combo_20_30.src | 0 KB | 05/03/2005 10:27:52 AM |
| combo_20_30_40.pas | 1 KB | 05/03/2005 11:11:04 AM |
| combo_20_30_40.src | 0 KB | 05/03/2005 10:27:53 AM |
| combo_20_40.pas | 1 KB | 05/03/2005 11:11:05 AM |
| combo_20_40.src | 0 KB | 05/03/2005 10:27:54 AM |
| combo_20_50.pas | 1 KB | 05/03/2005 11:11:06 AM |
| combo_20_50.src | 0 KB | 05/03/2005 10:27:56 AM |
| combo_20_60.pas | 1 KB | 05/03/2005 11:11:07 AM |
| combo_20_60.src | 0 KB | 05/03/2005 10:27:57 AM |
| combo_25_10.pas | 1 KB | 05/03/2005 11:11:08 AM |
| combo_25_10.src | 0 KB | 05/03/2005 10:27:58 AM |

-continued

| Name | Size | Created |
| --- | --- | --- |
| combo_25_10_20_40.pas | 1 KB | 05/03/2005 11:11:09 AM |
| combo_25_10_20_40.src | 0 KB | 05/03/2005 10:27:59 AM |
| combo_25_10_20_40_60.pas | 3 KB | 05/03/2005 11:11:10 AM |
| combo_25_10_20_40_60.src | 1 KB | 05/03/2005 10:28:01 AM |
| combo_25_10_40.pas | 1 KB | 05/03/2005 11:11:10 AM |
| combo_25_10_40.src | 0 KB | 05/03/2005 10:28:02 AM |
| combo_25_10_40_60.pas | 3 KB | 05/03/2005 11:11:11 AM |
| combo_25_10_40_60.src | 1 KB | 05/03/2005 10:28:03 AM |
| combo_25_10_60.pas | 2 KB | 05/03/2005 11:11:12 AM |
| combo_25_10_60.src | 0 KB | 05/03/2005 10:28:04 AM |
| combo_25_15.pas | 1 KB | 05/03/2005 11:11:13 AM |
| combo_25_15.src | 0 KB | 05/03/2005 10:28:05 AM |
| combo_25_15_20.pas | 1 KB | 05/03/2005 11:11:14 AM |
| combo_25_15_20.src | 0 KB | 05/03/2005 10:28:06 AM |
| combo_25_15_20_40.pas | 1 KB | 05/03/2005 11:11:15 AM |
| combo_25_15_20_40.src | 0 KB | 05/03/2005 10:28:07 AM |
| combo_25_15_20_40_60.pas | 3 KB | 05/03/2005 11:11:16 AM |
| combo_25_15_20_40_60.src | 1 KB | 05/03/2005 10:28:08 AM |
| combo_25_15_20_60.pas | 3 KB | 05/03/2005 11:11:16 AM |
| combo_25_15_20_60.src | 1 KB | 05/03/2005 10:28:09 AM |
| combo_25_15_30.pas | 1 KB | 05/03/2005 11:11:17 AM |
| combo_25_15_30.src | 0 KB | 05/03/2005 10:28:10 AM |
| combo_25_15_30_40.pas | 1 KB | 05/03/2005 11:11:18 AM |
| combo_25_15_30_40.src | 0 KB | 05/03/2005 10:28:11 AM |
| combo_25_15_30_40_60.pas | 3 KB | 05/03/2005 11:11:19 AM |
| combo_25_15_30_40_60.src | 1 KB | 05/03/2005 10:28:11 AM |
| combo_25_15_30_60.pas | 3 KB | 05/03/2005 11:11:20 AM |
| combo_25_15_30_60.src | 1 KB | 05/03/2005 10:28:13 AM |
| combo_25_15_40.pas | 1 KB | 05/03/2005 11:11:21 AM |
| combo_25_15_40.src | 0 KB | 05/03/2005 10:28:14 AM |
| combo_25_15_40_60.pas | 3 KB | 05/03/2005 11:11:22 AM |
| combo_25_15_40_60.src | 1 KB | 05/03/2005 10:28:15 AM |
| combo_25_15_60.pas | 2 KB | 05/03/2005 11:11:22 AM |
| combo_25_15_60.src | 0 KB | 05/03/2005 10:28:16 AM |
| combo_25_20.pas | 1 KB | 05/03/2005 11:11:23 AM |
| combo_25_20.src | 0 KB | 05/03/2005 10:28:17 AM |
| combo_25_20_40.pas | 1 KB | 05/03/2005 11:11:24 AM |
| combo_25_20_40.src | 0 KB | 05/03/2005 10:28:18 AM |
| combo_25_20_40_60.pas | 3 KB | 05/03/2005 11:11:25 AM |
| combo_25_20_40_60.src | 1 KB | 05/03/2005 10:28:19 AM |
| combo_25_20_60.pas | 2 KB | 05/03/2005 11:11:26 AM |
| combo_25_20_60.src | 0 KB | 05/03/2005 10:28:20 AM |
| combo_25_30.pas | 1 KB | 05/03/2005 11:11:27 AM |
| combo_25_30.src | 0 KB | 05/03/2005 10:28:21 AM |
| combo_25_30_40.pas | 1 KB | 05/03/2005 11:11:27 AM |
| combo_25_30_40.src | 0 KB | 05/03/2005 10:28:22 AM |
| combo_25_30_40_60.pas | 3 KB | 05/03/2005 11:11:28 AM |
| combo_25_30_40_60.src | 1 KB | 05/03/2005 10:28:23 AM |
| combo_25_30_60.pas | 2 KB | 05/03/2005 11:11:29 AM |
| combo_25_30_60.src | 0 KB | 05/03/2005 10:28:24 AM |
| combo_25_40.pas | 1 KB | 05/03/2005 11:11:30 AM |
| combo_25_40.src | 0 KB | 05/03/2005 10:28:25 AM |
| combo_25_40_60.pas | 2 KB | 05/03/2005 11:11:31 AM |
| combo_25_40_60.src | 0 KB | 05/03/2005 10:28:26 AM |
| combo_25_50.pas | 1 KB | 05/03/2005 11:11:32 AM |
| combo_25_50.src | 0 KB | 05/03/2005 10:28:27 AM |
| combo_25_50_60.pas | 2 KB | 05/03/2005 11:11:33 AM |
| combo_25_50_60.src | 0 KB | 05/03/2005 10:28:28 AM |
| combo_25_60.pas | 1 KB | 05/03/2005 11:11:33 AM |
| combo_25_60.src | 0 KB | 05/03/2005 10:28:29 AM |
| combo_30_10.pas | 1 KB | 05/03/2005 11:11:34 AM |
| combo_30_10.src | 0 KB | 05/03/2005 10:28:30 AM |
| combo_30_10_20_40.pas | 1 KB | 05/03/2005 11:11:35 AM |
| combo_30_10_20_40.src | 0 KB | 05/03/2005 10:28:31 AM |
| combo_30_10_20_40_60.pas | 3 KB | 05/03/2005 11:11:36 AM |
| combo_30_10_20_40_60.src | 1 KB | 05/03/2005 10:28:32 AM |
| combo_30_10_40.pas | 1 KB | 05/03/2005 11:11:37 AM |
| combo_30_10_40.src | 0 KB | 05/03/2005 10:28:33 AM |
| combo_30_15.pas | 1 KB | 05/03/2005 11:11:37 AM |
| combo_30_15.src | 0 KB | 05/03/2005 10:28:34 AM |
| combo_30_15_20.pas | 1 KB | 05/03/2005 11:11:38 AM |
| combo_30_15_20.src | 0 KB | 05/03/2005 10:28:35 AM |
| combo_30_15_20_40.pas | 1 KB | 05/03/2005 11:11:39 AM |
| combo_30_15_20_40.src | 0 KB | 05/03/2005 10:28:36 AM |
| combo_30_15_20_40_60.pas | 3 KB | 05/03/2005 11:11:40 AM |
| combo_30_15_20_40_60.src | 1 KB | 05/03/2005 10:28:37 AM |
| combo_30_15_30.pas | 1 KB | 05/03/2005 11:11:40 AM |
| combo_30_15_30.src | 0 KB | 05/03/2005 10:28:38 AM |

-continued

| Name | Size | Created |
|---|---|---|
| combo_30_15_30_40.pas | 1 KB | 05/03/2005 11:11:41 AM |
| combo_30_15_30_40.src | 0 KB | 05/03/2005 10:28:39 AM |
| combo_30_15_30_40_60.pas | 3 KB | 05/03/2005 11:11:42 AM |
| combo_30_15_30_40_60.src | 1 KB | 05/03/2005 10:28:40 AM |
| combo_30_15_40.pas | 1 KB | 05/03/2005 11:11:43 AM |
| combo_30_15_40.src | 0 KB | 05/03/2005 10:28:41 AM |
| combo_30_20.pas | 1 KB | 05/03/2005 11:11:44 AM |
| combo_30_20.src | 0 KB | 05/03/2005 10:28:42 AM |
| combo_30_20_40.pas | 1 KB | 05/03/2005 11:11:45 AM |
| combo_30_20_40.src | 0 KB | 05/03/2005 10:28:43 AM |
| combo_30_30.pas | 1 KB | 05/03/2005 11:11:46 AM |
| combo_30_30.src | 0 KB | 05/03/2005 10:28:44 AM |
| combo_30_30_40.pas | 1 KB | 05/03/2005 11:11:46 AM |
| combo_30_30_40.src | 0 KB | 05/03/2005 10:28:45 AM |
| combo_30_40.pas | 1 KB | 05/03/2005 11:11:47 AM |
| combo_30_40.src | 0 KB | 05/03/2005 10:28:46 AM |
| combo_30_50.pas | 1 KB | 05/03/2005 11:11:49 AM |
| combo_30_50.src | 0 KB | 05/03/2005 10:28:47 AM |
| combo_30_60.pas | 1 KB | 05/03/2005 11:11:49 AM |
| combo_30_60.src | 0 KB | 05/03/2005 10:28:49 AM |
| combo_35_10.pas | 1 KB | 05/03/2005 11:11:50 AM |
| combo_35_10.src | 0 KB | 05/03/2005 10:28:50 AM |
| combo_35_10_20_40.pas | 1 KB | 05/03/2005 11:11:51 AM |
| combo_35_10_20_40.src | 0 KB | 05/03/2005 10:28:51 AM |
| combo_35_10_20_40_60.pas | 3 KB | 05/03/2005 11:11:52 AM |
| combo_35_10_20_40_60.src | 1 KB | 05/03/2005 10:28:52 AM |
| combo_35_10_40.pas | 1 KB | 05/03/2005 11:11:53 AM |
| combo_35_10_40.src | 0 KB | 05/03/2005 10:28:53 AM |
| combo_35_10_40_60.pas | 3 KB | 05/03/2005 11:11:54 AM |
| combo_35_10_40_60.src | 1 KB | 05/03/2005 10:28:54 AM |
| combo_35_10_60.pas | 2 KB | 05/03/2005 11:11:55 AM |
| combo_35_10_60.src | 0 KB | 05/03/2005 10:28:55 AM |
| combo_35_15.pas | 1 KB | 05/03/2005 11:11:55 AM |
| combo_35_15.src | 0 KB | 05/03/2005 10:28:56 AM |
| combo_35_15_20.pas | 1 KB | 05/03/2005 11:11:56 AM |
| combo_35_15_20.src | 0 KB | 05/03/2005 10:28:58 AM |
| combo_35_15_20_40.pas | 1 KB | 05/03/2005 11:11:57 AM |
| combo_35_15_20_40.src | 0 KB | 05/03/2005 10:29:00 AM |
| combo_35_15_20_40_60.pas | 3 KB | 05/03/2005 11:11:58 AM |
| combo_35_15_20_40_60.src | 1 KB | 05/03/2005 10:29:01 AM |
| combo_35_15_20_60.pas | 3 KB | 05/03/2005 11:11:58 AM |
| combo_35_15_20_60.src | 1 KB | 05/03/2005 10:29:02 AM |
| combo_35_15_30.pas | 1 KB | 05/03/2005 11:11:59 AM |
| combo_35_15_30.src | 0 KB | 05/03/2005 10:29:04 AM |
| combo_35_15_30_40.pas | 1 KB | 05/03/2005 11:12:00 AM |
| combo_35_15_30_40.src | 0 KB | 05/03/2005 10:29:05 AM |
| combo_35_15_30-40_60.pas | 3 KB | 05/03/2005 11:12:01 AM |
| combo_35_15_30_40_60.src | 1 KB | 05/03/2005 10:29:06 AM |
| combo_35_15_30_60.pas | 3 KB | 05/03/2005 11:12:01 AM |
| combo_35_15_30_60.src | 1 KB | 05/03/2005 10:29:07 AM |
| combo_35_15_40.pas | 1 KB | 05/03/2005 11:12:02 AM |
| combo_35_15_40.src | 0 KB | 05/03/2005 10:29:09 AM |
| combo_35_15_40_60.pas | 3 KB | 05/03/2005 11:12:03 AM |
| combo_35_15_40_60.src | 1 KB | 05/03/2005 10:29:10 AM |
| combo_35_15_60.pas | 2 KB | 05/03/2005 11:12:04 AM |
| combo_35_15_60.src | 0 KB | 05/03/2005 10:29:11 AM |
| combo_35_20.pas | 1 KB | 05/03/2005 11:12:05 AM |
| combo_35_20.src | 0 KB | 05/03/2005 10:29:12 AM |
| combo_35_20_40.pas | 1 KB | 05/03/2005 11:12:05 AM |
| combo_35_20_40.src | 0 KB | 05/03/2005 10:29:14 AM |
| combo_35_20_40_60.pas | 3 KB | 05/03/2005 11:12:06 AM |
| combo_35_20_40_60.src | 1 KB | 05/03/2005 10:29:15 AM |
| combo_35_20_60.pas | 2 KB | 05/03/2005 11:12:07 AM |
| combo_35_20_60.src | 0 KB | 05/03/2005 10:29:16 AM |
| combo_35_30.pas | 1 KB | 05/03/2005 11:12:08 AM |
| combo_35_30.src | 0 KB | 05/03/2005 10:29:17 AM |
| combo_35_30_40.pas | 1 KB | 05/03/2005 11:12:09 AM |
| combo_35_30_40.src | 0 KB | 05/03/2005 10:29:19 AM |
| combo_35_30_40_60.pas | 3 KB | 05/03/2005 11:12:09 AM |
| combo_35_30_40_60.src | 1 KB | 05/03/2005 10:29:20 AM |
| combo_35_30_60.pas | 2 KB | 05/03/2005 11:12:10 AM |
| combo_35_30_60.src | 0 KB | 05/03/2005 10:29:21 AM |
| combo_35_40.pas | 1 KB | 05/03/2005 11:12:11 AM |
| combo_35_40.src | 0 KB | 05/03/2005 10:29:22 AM |
| combo_35_40_60.pas | 2 KB | 05/03/2005 11:12:12 AM |
| combo_35_40_60.src | 0 KB | 05/03/2005 10:29:23 AM |
| combo_35_50.pas | 1 KB | 05/03/2005 11:12:13 AM |
| combo_35_50.src | 0 KB | 05/03/2005 10:29:24 AM |

-continued

| Name | Size | Created |
|---|---|---|
| combo_35_50_60.pas | 2 KB | 05/03/2005 11:12:14 AM |
| combo_35_50_60.src | 0 KB | 05/03/2005 10:29:25 AM |
| combo_35_60.pas | 1 KB | 05/03/2005 11:12:14 AM |
| combo_35_60.src | 0 KB | 05/03/2005 10:29:26 AM |
| combo_40_10.pas | 1 KB | 05/03/2005 11:12:15 AM |
| combo_40_10.src | 0 KB | 05/03/2005 10:29:28 AM |
| combo_40_10_20_40.pas | 1 KB | 05/03/2005 11:12:16 AM |
| combo_40_10_20_40.src | 0 KB | 05/03/2005 10:29:29 AM |
| combo_40_10_20_40_60.pas | 3 KB | 05/03/2005 11:12:17 AM |
| combo_40_10_20_40_60.src | 1 KB | 05/03/2005 10:29:30 AM |
| combo_40_10_40.pas | 1 KB | 05/03/2005 11:12:18 AM |
| combo_40_10_40.src | 0 KB | 05/03/2005 10:29:30 AM |
| combo_40_15.pas | 1 KB | 05/03/2005 11:12:19 AM |
| combo_40_15.src | 0 KB | 05/03/2005 10:29:32 AM |
| combo_40_15_20.pas | 1 KB | 05/03/2005 11:12:20 AM |
| combo_40_15_20.src | 0 KB | 05/03/2005 10:29:32 AM |
| combo_40_15_20_40.pas | 1 KB | 05/03/2005 11:12:21 AM |
| combo_40_15_20_40.src | 0 KB | 05/03/2005 10:29:33 AM |
| combo_40_15_20_40_60.pas | 3 KB | 05/03/2005 11:12:22 AM |
| combo_40_15_20_40_60.src | 1 KB | 05/03/2005 10:29:34 AM |
| combo_40_15_30.pas | 1 KB | 05/03/2005 11:12:22 AM |
| combo_40_15_30.src | 0 KB | 05/03/2005 10:29:35 AM |
| combo_40_15_30_40.pas | 1 KB | 05/03/2005 11:12:23 AM |
| combo_40_15_30_40.src | 0 KB | 05/03/2005 10:29:36 AM |
| combo_40_15_30_40_60.pas | 3 KB | 05/03/2005 11:12:24 AM |
| combo_40_15_30_40_60.src | 1 KB | 05/03/2005 10:29:37 AM |
| combo_40_15_40.pas | 1 KB | 05/03/2005 11:12:25 AM |
| combo_40_15_40.src | 0 KB | 05/03/2005 10:29:38 AM |
| combo_40_20.pas | 1 KB | 05/03/2005 11:12:26 AM |
| combo_40_20.src | 0 KB | 05/03/2005 10:29:39 AM |
| combo_40_20_40.pas | 1 KB | 05/03/2005 11:12:26 AM |
| combo_40_20_40.src | 0 KB | 05/03/2005 10:29:40 AM |
| combo_40_30.pas | 1 KB | 05/03/2005 11:12:27 AM |
| combo_40_30.src | 0 KB | 05/03/2005 10:29:41 AM |
| combo_40_30_40.pas | 1 KB | 05/03/2005 11:12:28 AM |
| combo_40_30_40.src | 0 KB | 05/03/2005 10:29:43 AM |
| combo_40_40.pas | 1 KB | 05/03/2005 11:12:28 AM |
| combo_40_40.src | 0 KB | 05/03/2005 10:29:45 AM |
| combo_40_50.pas | 1 KB | 05/03/2005 11:12:29 AM |
| combo_40_50.src | 0 KB | 05/03/2005 10:29:46 AM |
| combo_40_60.pas | 1 KB | 05/03/2005 11:12:29 AM |
| combo_40_60.src | 0 KB | 05/03/2005 10:29:47 AM |
| dynproj3.dpr | 237 KB | 05/03/2005 10:27:04 AM |
| global.pas | 15 KB | 05/03/2005 11:09:56 AM |
| global.pl1 | 0 KB | 05/03/2005 11:09:35 AM |
| include0.pas | 4 KB | 05/03/2005 11:12:30 AM |
| include1.pas | 0 KB | 05/03/2005 11:09:58 AM |
| include2.pas | 6 KB | 05/03/2005 11:09:59 AM |
| include3.pas | 9 KB | 05/03/2005 11:19:35 AM |
| include4.pas | 1 KB | 05/03/2005 11:19:36 AM |
| Lmm3.dpr | 39 KB | 05/03/2005 10:27:05 AM |
| prod.pl1 | 0 KB | 05/03/2005 11:23:08 AM |
| prod.pl2 | 0 KB | 05/03/2005 11:23:10 AM |
| prod_10.pas | 12 KB | 05/03/2005 11:10:01 AM |
| prod_10.src | 12 KB | 05/03/2005 10:29:49 AM |
| prod_10.~pa | 18 KB | 05/03/2005 11:19:36 AM |
| prod_20.pas | 13 KB | 05/03/2005 11:10:02 AM |
| prod_20.src | 1 KB | 05/03/2005 10:29:50 AM |
| prod_25.pas | 13 KB | 05/03/2005 11:10:03 AM |
| prod_25.src | 1 KB | 05/03/2005 10:29:51 AM |
| prod_30.pas | 13 KB | 05/03/2005 11:10:04 AM |
| prod_30.src | 2 KB | 05/03/2005 10:29:51 AM |
| prod_35.pas | 13 KB | 05/03/2005 11:10:05 AM |
| prod_35.src | 1 KB | 05/03/2005 10:29:52 AM |
| prod_40.pas | 13 KB | 05/03/2005 11:10:06 AM |
| prod_40.src | 5 KB | 05/03/2005 10:29:53 AM |
| ptidl3.dpr | 35 KB | 05/03/2005 10:27:07 AM |
| rider.pl1 | 0 KB | 05/03/2005 11:23:10 AM |
| rider.pl2 | 0 KB | 05/03/2005 11:23:11 AM |
| rider_10.pas | 3 KB | 05/03/2005 11:10:07 AM |
| rider_10.src | 1 KB | 05/03/2005 10:29:54 AM |
| rider_15.pas | 4 KB | 05/03/2005 11:10:08 AM |
| rider_15.src | 0 KB | 05/03/2005 10:29:55 AM |
| rider_20.pas | 2 KB | 05/03/2005 11:10:09 AM |
| rider_20.src | 0 KB | 05/03/2005 10:29:57 AM |
| rider_30.pas | 2 KB | 05/03/2005 11:10:10 AM |
| rider_30.src | 0 KB | 05/03/2005 10:29:58 AM |
| rider_40.pas | 2 KB | 05/03/2005 11:10:11 AM |

-continued

| Name | Size | Created |
|---|---|---|
| rider_40.src | 0 KB | 05/03/2005 10:29:59 AM |
| rider_50.pas | 2 KB | 05/03/2005 11:10:12 AM |
| rider_50.src | 0 KB | 05/03/2005 10:29:59 AM |
| rider_60.pas | 2 KB | 05/03/2005 11:10:13 AM |
| rider_60.src | 1 KB | 05/03/2005 10:30:01 AM |
| rts2.dpr | 4 KB | 05/03/2005 10:27:08 AM |
| svd3.dpr | 6 KB | 05/03/2005 10:27:08 AM |
| sws4.dpr | 100 KB | 05/03/2005 10:27:09 AM |
| vaboot1.dpr | 0 KB | 05/03/2005 10:27:10 AM |
| vamsg1.dpr | 13 KB | 05/03/2005 10:27:11 AM |

The computer program listing appendix is hereby expressly incorporated by reference in the present application.

FIELD OF THE INVENTION

The present invention relates generally to financial products, more specifically to computer-based systems for hedging financial products, and, even more particularly, to a program generator for hedging the guaranteed benefits of a set of variable annuity contracts.

BACKGROUND OF THE INVENTION

Many insurance companies currently sell variable annuity contracts (VA's) that provide guaranteed death benefits and guaranteed withdrawal benefits. Variable annuities with such features provide a number of attractive benefits for the buyer:
   The ability to invest in a variety of actively-managed equity and fixed income mutual funds (VA funds), with the objective of achieving superior investment performance;
   Peace of mind for the buyer, since specified returns are guaranteed to be paid as withdrawal or death benefits, regardless of possible adverse fund performance; and
   Investment flexibility, through reallocation of money between the different VA funds available, either automatically or when requested by the buyer.

American life insurance companies have been offering guaranteed benefits on variable annuities for decades. Early designs offered de minimis guarantees (such as a guarantee that the annuity death benefit would not be less than the premium originally paid for the annuity). Intense competition, especially during the stock market boom of the late 1990's, led many life insurers to offer more elaborate and expensive guarantees. Such guarantees were usually either self-insured (i.e., notionally funded by some portion of contract fees) or reinsured, rather than hedged, as would be typical for other products with similar guarantees such as equity-indexed annuities (EIA's). See U.S. Pat. No. 6,049,772, Payne et. al., System for managing hedged investments for life insurance companies, as an example of how EIA's can be hedged.

The subsequent sharp decline in U.S. equity markets changed the focus of most life insurance companies: they became more concerned with managing the risk that they had taken on by guaranteeing VA returns, in some cases without full analysis of its magnitude. At the same time, U.S. insurance regulators and professional bodies such as the American Academy of Actuaries began work to ensure that the costs of variable annuity guarantees were reflected in the determination of reserve and risk-based capital requirements for such companies. It is generally believed that hedged benefits should be subject to lower capital requirements than unhedged benefits, since they subject the carrier to less risk.

Hedging the guaranteed benefits for a set of variable annuity contracts (VA hedging) is much more complex than hedging the benefits for a similarly-sized block of equity-indexed annuity contracts (EIA hedging), although both varieties of hedging can be classed as a type of option valuation problem. The additional complexity arises from a number of causes, including:
   Active fund management: many VA funds are actively managed, so their returns will not in general match the returns on liquid hedging instruments such as equity index futures, as would be the case with an S&P 500-indexed EIA, for example;
   The number of investment options: a single variable annuity contract may be invested in as many as 20 funds at a time, out of a total of 40, 50 or more VA funds;
   Variety of guarantee structures: VA death benefits may depend on an accumulation of premiums at varying interest rates, the maximum account value achieved at any prior anniversary, a percentage of any investment gain in the contract, or some combination of these items. VA withdrawal benefits are similarly diverse;
   Path-dependent benefits: the value of the guarantee under some of the guarantee structures depends not only on current VA fund values but on their history as well, making benefit valuation more difficult, and generally precluding the use of closed-form option valuation formulas;
   Interest-rate dependence: the long time scale (10-20 years or longer) of VA benefit guarantees magnifies the importance of the time value of money, so that accurate hedging requires a more sophisticated yield curve model than would typically be used in valuing shorter-term options.

Similarly, VA hedging is much more computation-intensive than EIA hedging. The complexities outlined above indicate that a number of apparently attractive computational shortcuts have pitfalls associated with them:
   The value of a guarantee depends on fund returns that will not be perfectly correlated with a given set of hedging instruments. Modeling the funds including inter-fund correlations will lead to more accurate results than the simplistic assumption that each fund can be replaced by a linear combination of hedging instruments, especially if an asset allocation or rebalancing program is in effect. This is in sharp contrast to the situation for EIA's;
   The difficulty of aggregating contracts with different mixes of VA funds while preserving optionality strongly suggests that a seriatim (contract at a time) valuation approach is the "gold standard" in terms of result accuracy, with any grouping of contracts requiring validation by comparing the results to this standard. Once again, this is in sharp contrast to the typical situation for EIA's;
   The path-dependent nature of many guarantee structures, together with their dependence on interest rates, strongly suggests that Monte Carlo simulation will be necessary for option valuation, since closed-form formulas for the value of the guarantees may not exist;
   These points (especially the first two) indicate that hedging guaranteed VA benefits is likely to be much more computation intensive than hedging EIA's.

Variable annuity guarantee designs continue to evolve quickly as life insurance carriers gain a better understanding of VA hedging. As well, many life insurance companies are moving towards "unbundling" guaranteed benefits into independent riders to increase client flexibility while keeping costs reasonable. To be truly useful, any system providing support for VA hedging must be flexible enough to add new benefits easily, to handle new combinations of benefits easily, and allow the user to specify the minimum amount of customized code necessary. These are characteristics that might be associated with a program generator, rather than a static program.

Additionally, a VA hedging system is much more useful if it is easy to verify its calculations, not only because of the financial reliance placed on its results by the insurance company, but also to ensure that regulators can rely on its results in determining reserve and risk-based capital requirements.

It is clear from the foregoing considerations that there are competing objectives with respect to complexity, computational speed, flexibility, and correctness, and that in general these will be hard to reconcile. A shorter, simpler hedging program in a high-level interpreted computer language may be easy to modify and verify, but have run-times too long to be practical, while a more elaborate program in a compiled computer language may run faster but be hard to prove correct and hard to modify.

Accordingly, there is a need for a VA hedging system program generator with provision for both easy-to-verify high-level interpreted computer code and high-performance, machine-architecture-optimized compiled computer code, and a means for comparing results from these two execution paths.

REFERENCES

The following references may be useful in understanding the invention:
*Financial Calculus*, Martin Baxter and Andrew Rennie (1996)
*The Market Model of Interest Rate Dynamics*, Alan Brace, Dariusz Gatarek, and Marek Musiela (1997)
*A Simulation Algorithm Based on Measure Relationships in the Lognormal Market Models*, Alan Brace, Marek Musiela, and Erik Schlogl (1998)
*LIBOR and swap market models and measures*, Farshid Jamshidian (1997)
*Arbitrage-free discretization of lognormal forward Libor and swap rate models*, Paul Glasserman & Xiaoliang Zhao (2000)
*Interest Rate Models Theory and Practice*, Damiano Brigo & Fabio Mercurio (2001)
*Drift Approximations in a Forward-Rate-Based LIBOR Market Model*, C. J. Hunter, P. Jäckel, and M. S. Joshi (2001)
*Modern Pricing of Interest-Rate Derivatives*, Riccardo Rebonato (2002)
*Stochastic Simulation*, Brian D. Ripley, Wiley (1987)
*Algorithms*, Robert Sedgewick (1983)
*Inner Loops* by Rick Booth (1997)
*A Very Fast Shift-Register Sequence Random Number Generator*, Scott Kirkpatrick and Erich P. Stoll, Journal of Computational Physics 40, (1981) 517-526
*Matrix Computations*, Gene H. Golub and Charles F. Van Loan (1989)
*Numerical Methods*, Germund Dahlquist and Ake Bjorck, Prentice-Hall (1974)

SUMMARY OF THE INVENTION

The invention can be summarized as a computer-based method for generating a program for hedging the guaranteed benefits of a set of variable annuity (VA) contracts, comprising:

user-selectable automatic generation of interpreted and compiled contract value projection code, with incorporation of user-specified custom projection code;

generation of vectorized integrated scenario sets incorporating arbitrage-free interest rate, hedging instrument, and VA fund values based on financial market data and regression and cointegration analysis of the VA funds and user-selected hedging instruments, with such vectorized integrated scenario sets arranged to maximize locality of data reference during the projection computation;

multi-threaded vectorized calculation of present value $PVG_{ij}$ of projected VA benefit guarantee cash flows for each VA contract i for each vectorized integrated scenario set j, with thread-safe caching of data for such vectorized integrated scenario set and such projection being performed according to a user-selectable projection mode with computation optionally distributed across a user-selectable set of servers;

calculation of differences of $PVG_{ij}$ to determine sensitivities to financial parameters ("Greeks") for each contract;

calculation of present value $PVA_{ij}$ of projected asset cash flows for each asset i for each vectorized integrated scenario set j;

calculation of differences of $PVA_{ij}$ to determine sensitivities to financial parameters ("Greeks") for each asset; and presentation of summary and detail asset and liability Greeks.

BRIEF DESCRIPTION OF THE DRAWINGS

We show data flow as a high-level description of the program generator. Dataflow diagrams are described in many standard sources, such as *Structured Design* by Larry Constantine and Ed Yourdon.

FIG. 1 (Code Generation) shows data flow for the generation of APL and Delphi code;

FIG. 2 (Scenario Set Generation) shows data flow for the generation of vectorized integrated scenario sets with maximum disk contiguity;

FIG. 3 (Value Projection) shows data flow for projection of discounted present values of benefit guarantee cash flows using the generated code on a single computer; and FIG. 4 (Distributed Processing) shows data flow (and code flow) for distributed computation of hedging sensitivity parameters ("greeks").

DETAILED DESCRIPTION OF THE INVENTION

A preferred embodiment of the invention generates code in both a high-level interpreted language (for ease of verification) and equivalent code in a compiled language (for faster execution). Many different target languages could play these roles. In this implementation we use APL as the interpreted language and Delphi (Borland Software's implementation of Object Pascal) as the compiled language, but many other language pairs (e.g. [Smalltalk,C++], or [Lisp, Fortran90]) are also possible. The assumed operating system is Microsoft Windows (e.g. Windows 98 SE or Windows XP). We provide brief descriptions of APL and Delphi here for convenience.

APL is an interpretive array-oriented programming language known for its terseness and unusual character set. It allows programmers to work with multi-dimensional matrices as easily as with single numbers, and its interactive, interpreted nature allows for extremely rapid application development. Its performance on scalar (i.e., one-item-at-a-time) problems is typically slow, however, because of interpretive overhead. APL was generalized to APL2 in the early 1980's by allowing elements of arrays to themselves be arrays ("nested arrays"): we follow the usual convention by referring to both languages simply as "APL".

Delphi is an object-oriented version of the well-known Pascal programming language. In addition to object-orientation, it features a number of extensions to the Pascal language that make it more suitable for system-level programming, such as close integration with the Win32 API, relaxed type-checking, and an inline assembler.

Current implementations of APL usually have a foreign-function interface (usually called quadNA for historical reasons) that allows APL functions to call procedures written in a compiled language such as Delphi, C++, or Fortran. This makes it feasible, given proper design, to write an application in APL, profile its performance, and then rewrite any bottlenecks in the most time-critical 10-20% of the code into a compiled language for increased speed.

Object-oriented programming is a well-known technique that allows programmers to take advantage of "family resemblances" between similar items by defining an inheritance hierarchy. The terminology used in object-oriented programming, such as message, method, subclass/superclass and instance variable, is well-known and is described in many standard sources, for example in Timothy Budd's textbook *An Introduction to Object-Oriented Programming*. As background, an object is a group of variables (think of fields in a record) together with functions and procedures that can operate on them. The functions and procedures are usually called "methods", and the variables are called "instance variables". The methods operate in response to "messages" from other objects, which are a lot like function or procedure calls. Figuring out how an object in an inheritance hierarchy should respond to a message is known as "method resolution" or "method dispatch".

Subclasses and Superclasses—Some objects may have family resemblances and so they may be arranged in a family tree or hierarchy. The more general object is the superclass and the more specialized object is the subclass. By defining methods as close to the root as possible we reduce the amount of code needed to implement a given set of behaviors. Typical examples here are zoological: rather than saying "eagles have two wings", "sparrows have two wings", and "ostriches have two wings", it may be easier to say "birds have two wings" and define eagles, sparrows, and ostriches as subclasses of birds.

Object-oriented programming is naturally suited to the description of variable annuity contracts and riders for VA hedging because new contracts, riders, and "combos" (our term for combinations of contracts and riders) often resemble earlier ones. This happens because new products and riders are very often incremental modifications of earlier ones, e.g. a rider providing that the VA death benefit will be at least equal to the sum of the premiums paid accumulated at 3% may give rise to a similar rider that uses a 4% accumulation rate on equity account values and a 0% accumulation rate on money-market account values. Object-orientation would therefore seem to be beneficial in the target language for a program generator for this problem domain.

We often use the word "policy" to mean the same thing as "combo" in the description below, i.e., to denote the concept "base contract together with all of its associated riders", to follow common insurance industry practice, although it is also common practice for "policy" to mean the same thing as "contract". The meaning should be clear from context.

Refines vs. Handles—An important distinction in our implementation is whether an object's method should be called in addition to any superclass method or instead of it. In the first case we say the subclass "refines" the superclass's handling of the message: in the second case we say it "handles" it. The terminology used in the object-oriented literature for this distinction is "Scandinavian vs. American semantics". We implement both approaches.

Unfortunately, most commercially-available implementations of APL do not support object-oriented programming. There have been published attempts to implement object-orientation using existing APL language facilities, but these have typically suffered from excessive interpretive overhead and large performance penalties. Some versions of APL (and the APL dialect J) have included some object-oriented support directly in the interpreter but these extensions are extremely vendor-specific and are not portable.

As well, object-oriented languages (of which the paradigmatic example is Smalltalk) were originally developed when the discrepancy between main processor speeds and RAM speeds was much less severe than it is today. There was much less overhead, comparatively, for branching or function call/return in David Ungar's well-known SOAR (Smalltalk on a RISC) chip, which ran at a clock speed of 2 MHz, than for today's multi-GHz processors. There is a conflict between object-oriented programming (which favors the use of many small "methods" or procedures and will typically have poor locality of reference) and today's cache-reliant architectures.

We resolve this clash by combining object-orientation with vectorization, which is described further below. We make object-oriented programming efficient for this problem domain through the use of vectorization, and then implement it using a common base description of the inheritance structure of policies, riders, and combos that can be used to generate both APL and Delphi code.

A useful concept here is a "virtual transaction". A virtual transaction changes the state of a vector of simulated combos in response to a simulated event, such as a simulated premium payment or simulated anniversary processing. Virtual transactions are thus similar to methods being applied in lock-step by a vector of objects, although in our implementation we use objects with vector instance variables since this leads to better cache utilization.

Virtual transactions are lightweight in the sense that they are executed in RAM, rather than in a database, and require no explicit serialization or locking (although some of the utilities invoked during the transaction may need to acquire a lock on the scenario cache as described below). They operate on many simulated combos at a time, typically hundreds or thousands in our implementation. They can therefore be very fast compared to a typical database transaction and (crucially) allow us to amortize method resolution overhead over thousands of policies, greatly increasing execution speed.

We start by defining a set of virtual transactions that change the value or status of a contract rider combination. Once these have been defined, then dispatching them is a conceptually simple recursive process for an object of class C (which may have a superclass of SC):

If SC exists, call SC's transaction handler;
Call C's transaction handler if it exists In practice, we have to modify this approach somewhat to define inheritance effectively for product/rider combos. In Delphi, with some precomputation, it can be changed from a stack-based recursive call to an iteration through a matrix of pointers to functions. Our APL dispatch implementation uses case statements, with the default behavior being processing by the superclass if any.

Our implementation of instance variables in Delphi uses dynamically-generated record layouts and field access routines, together with the Pascal "with" statement, to make instance variables accessible to compiled custom transaction processing code with no interpretive overhead. Our APL implementation of instance variables uses selective assignment with localization to marshal instance variables before invoking custom transaction processing code and unmarshal them afterwards.

In both APL and Delphi we require the superclass prefix property, which is that the only difference between class C's list of instance variables and the instance variable list of its superclass SC is that C may add some new instance variables to the end of the list. We enforce this requirement through the method of construction of the inheritance structure matrix.

In APL, this corresponds to new instance variables being added at the end of the nested array of instance variables. In Delphi, this corresponds to the instance variable record of the superclass being a prefix of that of the subclass.

As described above, vectorization is crucial both to achieving APL code that runs as fast as possible and to generating compiled object-oriented vectorized code with good cache locality on current processors. We describe this in more detail in the next few paragraphs.

Vectorization in this context means working with the values for many simulated policies at once in the course of a Monte Carlo simulation. A scalar implementation would take one simulated policy, run it though simulated transactions period by period until reaching the time horizon, and then move on to the next simulated policy. In contrast, a vectorized implementation would take some number of policies (say 1024—multiples of 128 work well on Intel architectures) and lock-step them through the simulation period by period.

Vectorization initially benefits both an interpreted implementation in APL and a compiled implementation in Delphi, although the reasons why are slightly different. APL executes scalar (i.e., "one-item-at-a-time") code inefficiently. Working with vectors of values makes much more efficient use of the APL interpreter.

Vectorization also provides benefits to both interpreted and compiled code by making more efficient use of the processor's memory cache hierarchy. Most processors today have a RAM cache of 256 Kb, 512 Kb, or more (this is typically called the "L2 cache" on Pentium processors), which is typically at least ten times as fast as main memory. Accessing items sequentially means that fewer cache loads from main memory are required, improving performance.

Vectorization provides further benefits, especially for single-precision floating point code, through use of the SIMD (Single Instruction Multiple Data) instruction set available on Intel Pentium III and later processors (SSE), which allows a single instruction to specify processing for 128-bit wide registers (i.e., 4 single precision floating-point numbers). Other processor chips such as Apple's G5 processor have similar instruction sets available (AltiVec).

Finally, vectorization provides even further opportunities for performance improvements in compiled code through better cache utilization via through "strip-mining" techniques, and reduced elapsed times through use of multiple processors on a multi-processor machine. Taking full advantage of this opportunity requires us to manage a thread-safe LRU cache of vectorized scenario records as described below.

Generated scenarios can easily be quite large relative to the amount of RAM that would typically be available to store them, even using single-precision floating point rather than double to save space. For example, with 50 funds, weekly simulated scenarios over a 20-year horizon, and 4096 scenarios, the amount of RAM required for storage is 50*52*20*4096*4 bytes, which is 851,968,000 bytes or 812.5 Mb. This is the same order of magnitude as the total available amount of RAM on many computers today. If multiple sets of scenarios are required (say 16 or so to calculate hedging exposure measures ("Greeks") by finite differencing) then the amount of storage exceeds the address space available on a 32-bit processor, and may require too much RAM to be practical even on current 64-bit systems if many scenarios are being simulated. It is clear that the volume of scenario data is such that some use of disk storage may be required.

We can turn this fact to our advantage by noting that projections for any one contract will use only a small fraction of the generated scenario values for projection if we arrange that a) scenarios are generated at a time interval of a week or so, and b) projections for a contract generate cashflows less frequently: say at quarterly intervals such as are commonly used for product pricing. In this case the scenario data divides naturally into 52/4=13 partitions depending on the issue week within a quarter, possibly subject to an initial "short quarter" bridging the interval between the valuation date and the policy's next "quartiversary" (integral number of quarters since issue).

If each partition were stored contiguously on disk, then seek time would be reduced during the projection computation. However, the natural order to generate the scenarios (temporally) is not the efficient order to read them from disk later, and so we want data that will be used together during the projection phase, rather than data that happens to be generated together, to be contiguous on disk.

A workable approach is to use priority queue buffering (similar to the replacement selection algorithms that were once popular as the initialization stage of tape-merge algorithms) while writing data to disk. The ordering of the priority queue is on record offsets within each scenario file. If the disk file system is not badly fragmented, this ordering preserves locality of reference, in the sense that records with similar offsets will tend to be close together on the disk, reducing seek time.

In detail, modern hard disks have fairly fast data transfer (say 100 Mb/s) once the read/write head of the disk is positioned properly. However, it takes a fairly long time (in computer terms—say 5-10 milliseconds) to position the disk head properly (this is called seek time) and for the correct sector to rotate under it (this delay is called rotational latency). Under mainframe operating systems such as MVS, these delays could be minimized by allocating datasets in cylinders and reading or writing entire tracks at a time. Modern PC operating systems typically don't let us specify that much detail on how files should be allocated.

However, in the random-access case we can improve on the naive strategy of just writing records to disk one at a time by a factor of 3-4. All modern disks support some form of linear byte addresses (LBA), where disk addresses can be specified as if the disk were a giant array of bytes, numbered zero to (say) 200 billion. The key observation is that typically, items with similar LBA's are physically close together on the disk, either on nearby sectors or nearby tracks. Therefore if we buffer our writes to disk and try to write long sequences of ascending LBA's (or descending, it makes no difference) then both seek time and rotational latency will typically be reduced.

Although actual LBA addresses are also lower-level information than modern. OS's typically pass on to the user, offsets in newly-allocated files on a recently-defragmented disk are pretty close to sequential (at least within fairly large contiguous blocks) so we can use these as a proxy for the harder-to-obtain LBA's.

Record offsets for the scenario files are computed by the getOffset function in the SWS4 dll, which, given a time series number (which identifies a fund series, a hedging instrument series, or a discount factor series), an epoch, and a scenario number, returns the file offset for that item. Since maximum file sizes are limited by the FAT32 file system under some versions of Windows, this is actually a "logical" file offset assuming no maximum. It is converted into a physical offset by dividing it by the maximum permissible file size and then using the quotient as the physical file number and the remainder as the offset within that physical file.

During the projection phase, we require not only contiguity and locality of reference, but also thread safety (i.e., correct operation using multiple threads and multiple CPU's) in order to achieve high performance. This is so because it is possible to overlap computation with disk access using threading, and possible to divide the computation across multiple processors to speed up projections using the same technique.

An LRU (Least Recently Used) scenario cache is instrumental in achieving this overlap. (Confusingly, such a cache is also called MRU [Most Recently Used] in the computer science literature). In our implementation there may be as many as four active threads all using the same LRU scenario cache per two-processor computer: they are a) the pre-read thread, b) the APL object constructor thread, and c) and d) two projection threads.

The pre-read thread attempts to hide disk latency using a pipelined-read method. At the same time that object construction or projection is taking place for the $n^{th}$ policy to be processed, the pre-read thread attempts to read the scenario data for the $P+n^{th}$) policy into the scenario cache, where p is the pipeline depth.

The choice of pipeline depth is determined empirically. If p is very small (say one) then there is little performance improvement, because there is little time to preread the scenario data. On the other hand, if it's very large, then it becomes increasingly likely that the pre-read will be wasted, because the record becomes the least-recently-used and is forced out of the cache before it is accessed by the projection threads. In practice, a value of p in the range of ten to twenty usually performs well.

The pre-read thread is usually the one that introduces new records into the scenario cache and forces out the least-recently used records, although the projection and object-construction threads may do this depending on the pipeline size, scenario cache size and the number of funds in which policies are invested. It is important for the scenario cache to function correctly regardless of the relative ordering of the reads and force-outs and the identity of the thread causing them. We use a locking method to avoid race conditions (i.e., situations in which the relative ordering of requests makes a difference).

Each thread must obtain the scenario cache lock before requesting a scenario record at a specific logical file offset. Additionally, each thread must relinquish the scenario cache lock during calls to operating system read routines (i.e., actual physical disk reads) to avoid holding up the other threads. Relinquishing the scenario cache lock during reads is not required for correctness but is required for maximum performance.

Designing a multi-threaded program requires careful attention to lock granularity and whether locking should be FIFO (first-in-first-out) or LIFO (last-in-first-out). It generally also requires minimization of calls to operating system routines. It is quite easy to accidentally write multi-threaded code that has worse performance than serial code, if the locks are too fine-grained (i.e., there's too much locking overhead relative to the amount of useful processing being performed) or too coarse-grained (i.e., threads have to wait a long period of time because serialization is so extensive that effectively only one thread can execute at a time), or if an excessive amount of time is spent in operating system routines rather than on the actual problem computations.

Operating systems typically contain primitives (semaphores or mutexes) that allow different threads to obtain exclusive control of a shared resource, but we'd like to avoid the overhead of O/S calls if possible for performance reasons. A possible method is to use a so-called "nonblocking" algorithm, which typically requires some kind of atomic (i.e., indivisible) read-and-replace instruction.

Fast LIFO locking (i.e., LIFO locking that minimizes operating system calls by exploiting atomic read-and-replace instructions, e.g., the CMPXCHG8B instruction on Pentium machines) is simpler to implement than fast FIFO locking. However, if there are three or more threads, one thread can be starved for CPU while the other two pass the lock back and forth: this can degrade overall system performance if throughput of all the threads is important.

Fast FIFO locking leads to better overall system performance since no computational tasks get starved for CPU: this is important because since the amount of time to perform projections for a contract is governed by the amount of time it takes the slowest task to complete. However, a simple implementation of this idea may introduce too much contention for the lock and require too many context switches to perform well in practice.

To reduce contention and context switches we use a hashing method on record offset to partition the cache into 20 or so subcaches that can be locked and unlocked independently. Although the caching regime is now LRU within each subcache, rather than globally LRU for the entire scenario cache, the hashing method distributes the records evenly enough across the subcaches to achieve an overall performance improvement.

An additional advantage arising from the cache management regime is that it is efficient to access part of a record: we use this in the multi-processor and strip-mining optimizations. The multiprocessor optimization is enabled by and makes use of the same techniques as the strip-mining optimization, so we describe the strip-mining optimization first.

The strip-mining optimization is predicated on the fact that processors typically have a smaller, faster cache ("L1 cache"), often on the order of 8 Kb in size, as well as the larger, slower L2 cache described above. If the number of scenarios being simulated is 4096, for example, then each scenario and instance variable vector is 16 Kb long: since this is larger than the L1 cache, it follows that values are constantly being forced out of it.

The strip-mining optimization works with segments of the vectors ("strips"). A typical number of elements in a strip might be 256. Instead of running through the virtual transaction cycle to the projection horizon once with vectors with 4096 elements (16 Kb), the strip-mining optimization would run through the virtual transaction cycle to the projection horizon 16 times with vectors of 256 elements (1 Kb). These shorter vectors are less prone to being forced out of the L1 cache, since most of the vector operation primitives used to implement the virtual transactions have only two or three operands.

Access to the strips is done by "stepping" the instance variable vectors (bumping pointers in their internal representation), rather than by copying values, and so is relatively efficient. Method resolution is handled by the efficient iterative method described above rather than the (conceptually simpler) recursive dispatcher.

Although there is some overhead in calling the methods for the virtual transactions more frequently, the strip-mining optimization typically achieves a factor of two speed increase over naïve (i.e., non-strip-mined) vectorization. More importantly, it sets the stage for effective use of multiple CPU's.

Note that the strip-mining optimization can be made to work in a compiled language, given sufficiently detailed control over the layout of vectors in RAM. In typical APL's, in contrast, it is almost always advantageous to work with larger vectors to amortize interpreter overhead.

The multi-processor optimization involves dividing the scenario and instance variable vectors into independent pieces and giving each available processor a piece to work on, then adding the result from each processor (the present value of benefit guarantees) together. Ideally the required elapsed time is equal to the time on a single processor divided by the number of processors, although function call overhead keeps this relationship from being exact in practice. The strip-mining optimization helps make this technique more effective, since it minimizes the necessity for synchronization between the processors by minimizing accesses to the L2 cache and main RAM.

The multi-processor and strip-mining optimizations can then be used together by dividing the scenario and instance variable vectors into strips, and dividing the strips among the available processors. Each processor then calculates the present value of benefit guarantees for a disjoint set of strips, and the present values are then summed.

We show data flow as a high-level description of the program generator. Dataflow diagrams are described in many standard sources, such as Structured Design by Larry Constantine and Ed Yourdon.

FIG. 1 (Code Generation) shows data flow for the generation of APL and Delphi code.

Initially, policy and rider inheritance structure data are combined with policy and rider pricing assumption data (by APL function define_inheritance and its subfunctions newClass, hasVars, handles, refines, and getAssnsFromFile) to create an inheritance structure matrix.

The inheritance structure matrix has ten components as follows, where N is the total number of classes (products, riders, and combos) declared, X is the number of different virtual transactions, and classes are represented by consecutive integers starting at one:
  cnames—a vector of length N of the class names;
  instvars—a vector of length N of the instance variables declared for each class;
  types—a vector of length N of the types of the instance variables declared for each class. Although APL is a dynamically-typed language, we impose a type system to allow for efficient code generation for both interpreted and compiled code. The types employed are:
    Boolean, integer, single (precision), double (precision)—these types have their usual meaning and we refer to them as "scalar types";
    Vafloat—a polymorphic type which resolves to either single or double depending on the projection mode;
    String, pchar—both refer to ASCII character strings, although there are some differences in Delphi memory allocation for the two types;
    Date—this can either be a Gregorian date (typical calendar date) or a Julian date (days elapsed since Jan. 1, 4713 B.C.)—the latter is more convenient for date arithmetic;
    Datevec—a vector of dates;
    Booleanvec, integervec, singlevec, doublevec, vafloatvec—these are all vectors of the scalar types described above;
    Booleanmat, integermat, singlemat, doublemat, vafloatmat—these are all matrices of the scalar types described above;
  superclasses—a vector of length N giving, for each class, its immediate superclass, or zero if it has no superclass.
  prrCodes—a vector of length N giving, for each class, its prrCode. Each prrCode is a vector composed of a product or rider number (if the class is a product or rider), or the product number concatenated with rider numbers (if the class is a combo). Rider numbers in a prrCode are always listed in canonical (sorted by absolute value) order.
  $hm_{ij}$—a matrix with N rows and X columns, which contains one if class i handles virtual transaction j (i.e., processes it without first invoking superclass processing) and zero otherwise;
  $rm_{ij}$—a matrix with N rows and X columns, which contains one if class i refines virtual transaction j (i.e., processes it after invoking superclass processing) and zero otherwise;
  xactnames—a vector of length X of the names of the virtual transactions;
  xacts—a vector of length X of the transaction numbers of the virtual transactions; and
  assns—a vector of length N containing the projection assumption data in its character (unparsed) representation.

The genInstanceVarFiles function generates instance variable files for product and rider classes from the inheritance structure matrix.

The genAssnVarFiles function generates assumption variable files, both for global assumptions (i.e., those that are common to all products, riders, and combos) and for product, rider, and combo classes from the inheritance structure matrix.

The buildDelphi function first invokes the buildAssns, buildRecords, and buildHandlers functions to build include files for assumptions, instance variables, and virtual transaction handlers, and then uses the compileAll function to invoke the Delphi command-line compiler dcc32.exe, which builds the dynamic projection DLL (dynproj) from the source and include files. The unloadDLL and loadDLL functions are used to make sure that the DLL is not in use when it is being rebuilt (the compile step will fail if so, because Windows will not allow a DLL to be rebuilt while it is in use.

genAPLCode generates APL source code for each class and then uses the {quad}FX system function to create executable APL functions from the source code. Initially code for the master virtual transaction dispatcher is generated, which generates calls to appropriate assumptors, which call the APL function project, which dynamically calls the dispatcher for the appropriate class, which in turn calls the virtual transaction handler for each transaction, which may in turn require calls up the superclass chain in order to fully implement the virtual transaction.

Then each class is categorized as a product, rider, or combo. Depending on the categorization of the class, genAPLCode either calls:
  genProductAssumptorCode, genProductConstructorCode, genProductDispatchCode, genProductHandlerCode, and genProductGetterCode, or
  genRiderAssumptorCode, genRiderConstructorCode, genRiderDispatchCode, genRiderHandlerCode, and genRiderGetterCode, or
  genComboAssumptorCode, genComboConstructorCode, genComboDispatchCode, genComboHandlerCode, and genComboGetterCode.

As is clear from the naming convention, the code generated for each class can be categorized as an assumptor, constructor, dispatcher, handler, or getter. The names are fairly self-explanatory, and these five classes of generated code provide the building blocks necessary for implementing object-oriented VA hedging code in APL and Delphi:

Assumptor—sets projection assumptions for use by the class, resolving as necessary overrides of superclass assumptions by subclasses, and making the resulting assumptions available for all projection modes (APL and Delphi).

Constructor—constructs a projectable object from assumptions and policy, rider, contribution, bucket, and transaction data files, for projection by either APL or Delphi generated code.

Dispatcher—generates case statements to dispatch calls to virtual transaction handlers, prefixed with calls to the class's superclass if a) there is one and b) the virtual transaction handler is a refinement of an existing one.

Handler—generates localization and variable unpacking/repacking logic and incorporates any custom transaction handler code.

Getter—provides access to a product, rider, or combo's instance variables by name.

FIG. 2 (Scenario Set Generation) shows data flow for the generation of vectorized integrated scenario sets with maximum disk contiguity.

VA fund unit value histories are read from files using the getUnitHist function and are reflated (i.e., fund-level management expenses are backed out to obtain pre-expense asset performance) by the reflateUnitHist function. The getUnitHist function is also used to read equity hedging instrument histories since they are in the same format.

Eurodollar futures history data is read and combined into a history of forward interest rates by the Hedge_getForwardCurve function.

Correlation and cointegration analysis of the fund histories and the hedging instrument histories is performed by the getFundCoeff function. The regression analysis routines used rely on the URV matrix decomposition as described below.

A yield curve is a collection of zero-coupon bond yields with a specified spacing (say every three months) and a specified maximum term (say 20 years). Yield curve principal component volatilities and current swap yields are used as input to the Libor Market Model yield curve generator. As is described more fully below, this generator can be used to create "snapshots" of arbitrage-free yield curves in the spot-Libor numeraire at a user-specified time steps (say every week) out to a specified time horizon (such as twenty years). These interest rate scenarios can be used to construct prices for fixed income assets (such as a rolling investment in 5-year zero coupon bonds) that might be used to hedge bond funds or balanced funds.

Since these interest rate scenarios are generated under the spot Libor numeraire, they can also be used to provide a short interest rate for the generation of equity scenarios and to discount projected cash flows on a consistent basis.

We therefore define an integrated scenario as one in which the interest rates are generated using LMM and the equity scenarios are generated using the relevant simulated short rate. These integrated scenarios allow us to value arbitrary VA benefits without having to pre-classify them as primarily equity-based or interest based. These integrated scenarios are generated by the Hedge_genScenarios function and its subfunctions.

The efficient order in which to generate integrated scenarios (i.e., advancing the simulated hedging instruments and funds using the current short rate, assumed volatilities, and correlations, and then advancing to the next simulated yield curve to get a new short rate) is different from the efficient disk layout for a couple of reasons. As described above, given 52 interest time steps per year and quarterly cashflow projection, the scenarios as used in projection are naturally partitioned into 13 disjoint sets.

Further, a policy will not typically be invested in all of the available funds, but for the ones where it is invested, the fund values for each scenario will be required. Ideally these would be read into contiguous locations in RAM for ease of vectorized processing, and since data transfer is quite fast (say 100 Mb/s) on today's disk hardware once a seek to the correct location has been done, we conclude that we want to write the scenario data so that items that will be accessed at the same time will be contiguous on disk.

Some shuffling or reordering is therefore required to reorganize the scenario data into an efficient layout, and the volume of data is such as to in general preclude doing this in RAM.

However, naively seeking from one part of the disk to another to build the efficient disk layout directly (i.e., using the disk as a pure random-access device) would itself be a slow process. We require a method of constructing contiguous vectorized scenario data that achieves acceptable performance during the generation phase as well as during the projection phase.

We accomplish this by using a priority queue buffering algorithm where the ordering is on offsets within each scenario file, as described above. This method reduces the runtime during the scenario generation phase by a factor of four, and speeds up the projection process by minimizing the required number of disk seeks and maximizing contiguity. The routines in the SWS4 (scatter-write scenarios) DLL implement priority queue buffering.

FIG. 3 (Value Projection) shows data flow for projection of discounted present values of benefit guarantee cash flows using the generated code on a single computer.

The projection modes are:
0=APL
1=Hybrid APL/Delphi double precision
2=Hybrid APL/Delphi single precision
3=Delphi double precision
4=Delphi single precision
5=Stripmined Delphi single precision
6=Unwound stripmined Delphi single precision
7=Dual unwound stripmined Delphi single precision
8=Concurrent dual unwound stripmined Delphi single precision Generally, the lower projection modes execute more slowly and provide more detailed reporting, and the higher modes are execute more quickly and provide more streamlined reporting. The ratio of execution speed between modes 8 and 0 is on the order of 40.

The data describing inforce contracts and riders is read from disk, and records with corresponding policy numbers are merged into a policy/rider data structure by the getPolicyData function and its subfunctions. The policy/rider data structure contains data that has already been parsed into fields that can be accessed by name (rather than record offset) to decouple the character representation of the data from its name and type—this approach makes it easy to change the file format while requiring only minimal changes to the rest of the program. The getPolicyData function also returns the "prr code"—a representation of the base policy and attached riders as an integer vector.

Note that the five data files (policy, rider, contribution, bucket, and transaction) closely correspond to tables in a normalized relational database design.

The generated master dispatcher uses the prr code to invoke the constructor and assumptor functions for the combo represented by the code, constructing a projectable policy object. Depending on the projection mode, the object is either an APL nested array or an integer that is (in fact) a pointer to the memory address where the Delphi representation of the object resides. Constructors and assumptors both support inheritance, so that new products and riders similar to existing ones can take advantage of existing code.

The generated master dispatcher calls the project function, which acts as the driver routine for the virtual transaction cycle. Depending on the projection mode, it either invokes generated APL code for vectorized processing of the virtual transactions and provides more detailed output for checking and reconciliation, or generated Delphi code that is optimized to provide present values of cash flows efficiently.

The vectorized virtual transactions are defined in the define_inheritance function and are as follows:
- xRunTo—updates persistency, credits interest to fixed buckets, applies current unit values to get current accumulation value.
- xTrigger—applies timed changes in policy or rider state.
- xBonusCredit—calculates and applies any bonus credits.
- xUpdateCDSL—updates current surrender charges (also known as CDSL's: contingent deferred sales loads) depending on premium history, accumulation value, and duration.
- xUpdateBenBase—updates values for policy and rider benefits that depend on values other than the accumulation value, such as roll-up death benefits.
- xDeath—calculates simulated death benefits depending on policy and rider characteristics and projection assumptions.
- xNursingHome—calculates simulated nursing home benefits depending on policy and rider characteristics and projection assumptions.
- xAnnuitize—calculates simulated annuitization benefits depending on policy and rider characteristics and projection assumptions.
- xFullSurrender—calculates simulated full surrender benefits depending on policy and rider characteristics and projection assumptions.
- xCalcPartialWithdrawal—applies partial withdrawal assumption, free amount, and cdsl to figure out amount actually withdrawn and the charges incurred.
- xApplyPartialWithdrawal—this transaction reduces account balances according to the amount of partial withdrawals previously calculated. Some benefit riders make this more complicated than just applying the partial withdrawal benefit to all buckets uniformly.
- xPrem—applies simulated future premium payments to accumulation value.
- xCalcCharges—calculates contract, M&E, distribution, and rider charges based on product and rider characteristics and account balances.
- xSumCharges—aggregates the charges calculated.
- xTakeCharges—takes rider and M&E charges from account balances to the extent possible. This may require some explanation: if the policy is being kept in force with a zero account balance because of benefit rider provisions, it may not be possible to reduce the balance below zero.
- xRebalance—rebalances funds between accounts based on asset allocation rules.
- xRollover—updates credited interest rates for fixed accounts at the end of the account term.
- xShutdown—forces full surrender at the end of the projection period.
- xRecordCf—records net cash flow for the policy and any riders, broken out by account type.
- xCalcDecrs—calculates decrements to be applied at the next simulated quarter according to projection assumptions and account balances.

The vector of simulated policies is projected forward from the valuation date to the projection horizon and, depending on the projection mode, either detailed cashflows are recorded for display and verification, or a present value of benefit guarantee cashflows is recorded.

FIG. 4 (Distributed Processing) shows data flow (and code flow) for distributed computation of hedging sensitivity parameters ("greeks"). Depending on the number of greeks required to be calculated, as many as 120 computers can collaborate on the computation of greeks for a set of policies, and further parallelism can be achieved if more computers are available by dividing the set into disjoint subsets, computing the greeks for each subset, and then adding the results together.

A copy of the VA Hedging bootstrap program resides on each machine that is available for hedging computation. The APL function prepServers sends commands to the bootstrap programs via TCP/IP, telling each of them to copy the most up-to-date version of the generated DLL (dynproj), utility DLL's, and a runtime version of the APL workspace to the machine on which the bootstrap program resides ("local machine"). Once the bootstrap programs have finished copying they each invoke a copy of the APL runtime interpreter with the runtime workspace ("server program") on the local machine.

The APL function goServers sends commands to each server, providing them with the location of shared data to be read over the network (such as projection assumption data and unit value histories) and the list of servers that will be collaborating. From its position in the list, each server determines the subset of scenario sets for which it is responsible and computes the appropriate present values.

Note that, unlike projection assumption data, scenarios are generated and accessed locally on each machine because of the volume of data processed. This makes the projection as fast as possible. If the scenario data were kept on one machine and accessed over the network by many servers, then access to the data would not benefit from its contiguous layout (since requests would in general by coming from a number of servers without any synchronization) and excessive network traffic would result.

Market values are returned from each server as APL arrays over the TCP/IP connection to the invoking workspace (i.e., the one from which prepServers and goServers were invoked). Greeks are then computed by the getGreeksFromValues function. The greeks that are computed have a column layout as follows:
- 1—Present value of liability option;
- 2-4—Deltas with respect to equity hedging instruments 1, 2, and 3;
- 5-7—Gammas with respect to equity hedging instruments 1, 2, and 3;
- 8—Rho of liability option;
- 9—Dollar convexity of liability option;
- 10-12—Vegas with respect to equity hedging instruments 1, 2, and 3;
- 13—Theta;

14-20—Key rate durations (with maturities 1, 2, 3, 5, 7, 10, and 20 years) of liability option;

21-25—Key rate vegas (with expiries 1, 3, 5, 7, and 10 years) of liability option with respect to the first equity hedging instrument;

26-30—Key rate vegas of liability option with respect to the second equity hedging instrument;

31-35—Key rate vegas of liability option with respect to the third equity hedging instrument;

36-37—Interest rate stress test—market values for a parallel upward shift in yields of 100 bp and a parallel downward shift in yields of 100 bp respectively;

38-43—Equity market stress test #1—market values for increases of 10% in value of each of the three equity hedging instruments (columns 38-40), and decreases of 10% in value (columns 41-43);

44-49—Equity market stress test #1, cont'd—deltas for increases of 10% in value of each of the three equity hedging instruments, and decreases of 10%, respectively;

50-55—Equity market stress test #1, cont'd—gammas for increases of 10% in value of each of the three equity hedging instruments, and decreases of 10%, respectively;

56-61—Equity market stress test #1, cont'd—vegas for increases of 10% in value of each of the three equity hedging instruments, and decreases of 10%, respectively. Vegas are calculated using a one-sided approximation to avoid generating even more scenario sets;

62-67—Equity market stress test #1, cont'd—rhos for increases of 10% in value of each of the three equity hedging instruments, and decreases of 10%, respectively. Rhos are calculated using a one-sided approximation;

68-73—Equity market stress test #2—market values for increases of 25% in value of each of the three equity hedging instruments (columns 68-70), and decreases of 25% in value (columns 71-73);

74-79—Equity market stress test #2, cont'd—deltas for increases of 25% in value of each of the three equity hedging instruments, and decreases of 25%, respectively;

80-85—Equity market stress test #2, cont'd—gammas for increases of 25% in value of each of the three equity hedging instruments, and decreases of 25%, respectively;

86-91—Equity market stress test #2, cont'd—vegas for increases of 25% in value of each of the three equity hedging instruments, and decreases of 25%, respectively. Vegas are calculated using a one-sided approximation;

92-97—Equity market stress test #2, cont'd—rhos for increases of 25% in value of each of the three equity hedging instruments, and decreases of 25%, respectively. Rhos are calculated using a one-sided approximation.

Financial Models Required For Pricing

A realistic and arbitrage-free yield curve model is required to consistently value VA benefit guarantees because a) interest rates vary by term to maturity (this variation by term is usually referred to as the "yield curve"), and b) interest rates are not constant but vary stochastically over time.

A good introduction to some of the key issues related to financial modeling of equity and interest-rate derivatives is *An Introduction to the Mathematics of Financial Derivatives* by Salih N. Nefici.

Regression Engine—Requirements

Cointegration—Before we can generate scenarios with consistent hedging instrument prices and fund unit values, we must analyze historical unit value and hedging instrument time series. The user can specify whether a cointegration analysis (regression of log fund values on log hedging instrument prices) is to be attempted or whether a correlation analysis (regression of fund returns on hedging instrument returns) is to be attempted. A good source for information on cointegration analysis is *Market Models: A Guide to Financial Data Analysis* by Carol Alexander.

Determining the appropriate asset mix to hedge a VA fund can be modeled mathematically as a linear regression problem, both in the cointegration and correlation cases. If cointegration of the hedging instrument prices and the fund unit values holds, then the predictor variables are the log prices of the hedging instruments and the response variable is the log VA fund unit value. If correlation holds, then the predictor variables are hedging instrument returns and the response value is the fund return.

This is a generalization of the tracking problem typically facing an index fund manager, i.e., how to construct a portfolio tracking, e.g., the S&P 500 Index without having to take a position in each of the 500 stocks comprising the index.

Although there are many software packages, such as SAS, that can be used to perform regression analysis, there are substantial difficulties in applying standard methods to this problem, for the following reasons:

Data Volume

Incremental Solution

Collinearity/Condition Number

Each of these difficulties is discussed in turn.

Data Volume: Each data row (i.e., vector of hedging instrument prices and mutual fund prices) is referred to as an observation. The number of observations could be very large. The data volume could therefore be very large, and so any approach that requires all the data to be simultaneously accessible will likely be slow.

Incremental Solution: The relationship between the predictor and response variables will change over time as fund managers change their holdings. It therefore makes sense, rather than attempting to calculate regression coefficients "once and for all", to be able to update them based on incoming financial market information. Standard packages, which read the entire dataset and then calculate a solution, are not as efficient in this regard.

Collinearity/Condition Number: Any approach that starts with the traditional "invert the X'X matrix" approach to regression may lead to computational problems for two different reasons: forming the X'X matrix roughly squares the condition number of the problem, and the matrix will in general be ill-conditioned. An ill-conditioned X'X matrix will lead to parameter estimates (and hence hedge positions) with terms opposite in sign and almost equal in absolute value: this is undesirable. It will also lead to unstable parameter estimates, which in hedging terms means making large position changes as updated asset prices come in: this is also undesirable.

Regression Engine—Two Almost-Solutions

A popular way of computing continually-updated parameter estimates is the so-called recursive least-squares estimator. This is described in (for example) *Optimal Control and Estimation* by Robert F. Stengel. This method is difficult to apply in this case because it requires a matrix inversion to get the initial parameter estimate and so will not work if the matrix is rank-deficient.

A popular way of dealing with collinearity and conditioning problems in linear regression is to use the Singular Value Decomposition (SVD) of a matrix. A=UWV' where U and V have orthonormal columns and W is diagonal. If A is rank deficient then zeros appear on the diagonal of W. A description of the SVD can be found in standard sources such as *Numerical Recipes in C*. The main problem with using SVD is that there is no known way to update the SVD efficiently for incoming data rows, so that the method is not suited to the development of an incremental solution. This vastly increases the processing requirements.

Incremental Hedge Engine—Solution

An updateable matrix decomposition sharing many of SVD's good characteristics is the rank-revealing URV decomposition. This matrix decomposition was introduced by G. W. Stewart in "An Updating Algorithm for Subspace Tracking" (IEEE Transactions on Signal Processing, Vol. 40, No. 6, June 1992) for phased-array radar applications. However, it turns out that it can be adapted to linear regression problems, and that the resulting algorithms are an excellent fit for this problem for the following reasons:

The decomposition is A=URV' where U and V are orthogonal and R is right-triangular. Rank deficiency can be detected easily because the determinant of R is just the product of its diagonal elements. The method uses only Givens rotations, which are orthogonal transformations, so the problem is as well-conditioned as possible.

The method allows efficient determination of the condition number of the problem (since efficient condition number estimators for triangular matrices exist). The method allows for efficient determination of hedging parameters and standard errors. Memory usage for the method depends only on the number of predictor and response variables, not on the number of observations. This can be viewed as a very specialized data compression algorithm.

Yield Curve Generation Method

We generate yield curves using the Libor Market Model (see mathematical summary and references below), allowing for an arbitrary initial yield curve and stochastic interest rates.

The Libor Market Model

Model Domain: Yield Curves and Interest Rate Options.

Key Characteristics of the Model:

1. The model has arbitrage-free and physical settings, depending on whether the market price of risk is set to zero (arbitrage-free) or not (physical).

2. In the arbitrage-free setting, the model can reproduce market prices of bonds and fixed income options.

3. In the physical setting, the model can generate realistic (i.e., simulated historical) bond price scenarios.

4. The yield curve can undergo a variety of realistic non-parallel shifts.

5. The correlation structure of changes in the yield curve can be based on physical volatility data (historical time series) or current market volatility data (e.g., futures option prices).

Outline of Mathematical Formulation:

1. The yield curve can be modeled using different measures (e.g., forward measure, spot Libor measure).

2. For scenario generation, we use the spot Libor measure (which corresponds to the "bank account" numeraire) with the Glasserman-Zhao discretization. We also give the forward measure equations since the Hunter-Jackel-Joshi predictor-corrector method is useful in pricing interest-indexed products.

3. Bond prices divided by the numeraire are martingales.

4. Forward Libor interest rates are assumed to be lognormally distributed.

5. Discrete tenors (zero-coupon bonds maturing integral periods of time from the initial date) are assumed. A quarterly tenor can be used for scenario generation and an annual tenor for interest-indexed product pricing.

6. Natural cubic spline interpolation is used to derive bond prices at other maturities in the scenario generator.

Key Equations (Forward Measure):

$$L_n(t)=(1/\delta)[B(t,T_n)/B(t,T_{n+1})-1]$$

$$dL_{n-1}(t)=L_{n-1}(t)\gamma_{n-1}(t).dW_n(t)$$

$$dW_{n+1}(t)=dW_n(t)+\delta\gamma_n(t)L_n(t)/(1+\delta L_n(t))dt$$

What The Variables Mean:

$B(t,T_n)$ is the price at time t of a bond maturing at time $T_n$, $\delta$ is the common spacing between $T_0, T_1 \ldots T_n$, $L_n(t)$ is a forward Libor rate at time t, $dW_n(t)$ is an increment in d-dimensional Brownian motion at time t, $\gamma_{n-1}(t)$ is a d-dimensional vector volatility function, and . is the inner product of two d-dimensional vectors.

Key Equations (Spot Libor Measure, Glasserman-Zhao Discretization):

$$D_n(t)=B(t,T_1)\Pi(1/(1+\delta L_j(t))), \text{ where the product is over the range } j=1 \text{ to } n-1$$

$$D_n((i+1)h)=D_n(ih)\exp([k_i|\sigma_n(ih)|-\tfrac{1}{2}\sigma_n(ih).\sigma_n(ih)]h+\sigma_n(ih)h^{1/2}\epsilon_{i+1})$$

$$\sigma_{n+1}(ih)=-\Sigma\phi(1-D_{i+1}/D_i)\lambda_i(t), \text{ where the sum is over the range } i=\eta(t) \text{ to } i=n$$

What The Variables (and Functions) Mean:

$D_n$ is a deflated bond price, h is the time step selected for the discretization, $k_i$ is the (d-dimensional vector) market price of risk, $\sigma_n$ is the d-dimensional vector of volatilities of deflated bond prices, $\epsilon_i$ is a d-dimensional vector of normal random variates, $\phi(x)$ is min(1,max(x,0)), $\eta(t)$ is the next tenor date, i.e., the unique integer such that $T_{\eta(t)-1} \leq t < T_{\eta(t)}$, and $\lambda_i(t)$ is a d-dimensional vector specifying the volatility of $L_i(t)$, a forward Libor rate at time t Implementation Notes:

1. The current scenario generation implementation is a six-factor model, i.e., it has d=6.

2. The Glasserman-Zhao discretization is used so that the $D_n$ are martingales, not just in the limit as the time-step becomes infinitesimal but for finite time steps as well.

3. Despite the name "Libor Market Model", there is no bar to applying the model to Treasury rates.

Comments on Key Algorithms Used

Singular Value Square-Root Decomposition

The method finds a lower triangular factor L of a symmetric matrix A such that LL'=A, where ' denotes matrix transpose, as described in Matrix Computations, Golub and Van Loan, and by Golub and Reinsch. This method is superior in this application to the well-known Choleski square-root decomposition since the matrix need not be of full rank.

R250

This generator is based on the properties of linear feedback shift registers and uses only logical (bitwise exclusive-or) operations and is therefore very fast on binary computers. It also has an extremely long period—approximately $10^{75}$. A linear congruential multiplicative generator could be used instead although performance might suffer and period exhaustion would probably occur.

APL Source Code

A portion of the source code in the appended files is programmed as an APL workspace. It requires APL+Win version 3.5 from APL2000. The top-level function in the workspace is named "go". It relies on a number of general projection assumptions that can be found in the character matrix "Assns'. This matrix should be edited [likely by using the APL) EDIT editor] to ensure that the assumptions are up-to-date before running the top-level function. Running the "go" function creates an APL matrix called "Greeks". Each row corresponds to one policy and each column corresponds to one "greek" (exposure measure).

Depending on the value of projectionMode in the Assns matrix the cashflow projection for the VA is done using APL (which is the slowest method but easiest to debug), a hybrid of APL and compiled code (which is intermediate in speed), or almost entirely in compiled code.

If the APL implementation of cashflow projection is in use, then "self" (the current policy together with any riders) is a nested vector (of account values, surrender charges, and so on). If a hybrid or compiled cashflow projection implementation is in use, then "self" is a scalar integer that the dynproj DLL uses to refer to the memory allocated to the combo in the DLL.

Delphi Source Code

A portion of the source code in the appended files is programmed as a DLL. It requires Delphi version 4.0 from Borland/Inprise.

LMM2.dll—General Description

Source file: lmm2.dpr

The purpose of the program is to generate zero prices under spot Libor measure fairly quickly. A good introduction to the use of various measures in derivative pricing is given in the Neftci book, while a more technical description is given by Musiela and Rutkowski.

The approach taken builds on the arbitrage-free discretization of Glasserman and Zhao and the spot Libor measure presented by Jamshidian. The spot Libor measure is the closest analog to the risk-neutral measure often used for pricing equity derivatives. A Brownian Bridge process is used for the price evolution of the shortest bond.

The program assumes constant tenor spacing (i.e., intervals between maturity dates of underlying zero-coupon bonds whose price evolution is being simulated). A nonzero market price of risk is supported to allow for both real-world or "physical" and arbitrage-free settings. Arbitrage-free settings are appropriate for pricing interest-rate derivatives, while insurance carrier pricing as performed by actuaries has typically been based on a real-world or "physical" setting, rather than the arbitrage-free setting.

Given typical starting yield curve values, in the arbitrage-free setting interest rates tend to increase over time, without bound: this effect is especially pronounced starting 20-30 years from issue. This appears implausible from an economic point of view, although it does embody the theoretically correct way to price financial instruments. With the introduction of a market price of risk as implied by the analyzed body of Treasury yield data, mean interest rates are more stable over time, although they continue to display considerable dispersion around the mean.

The "real-world" setting is also appropriate for the analysis of historical yield curve data.

Program speed is greatly increased by use of a Chebyshev approximation for the exponential rather than the built-in hardware operation code. The program is used as a scenario generator in a reference implementation of pricing for the product. The forward measure implementation (which is considerably faster) is described below.

LMM2.dll—Detailed Method of Operation function marG(x: double): double;

This function is used in the Marsaglia-Bray normal random number generator as cited in Ripley.

function marNorm: double;

This function implements the Marsaglia-Bray normal random number generator given in Ripley, which is considerably faster than the Box-Muller method because it uses fewer transcendental calls on average.

procedure r250Init;

This procedure sets up the initial state for an improved version of Kirkpatrick and Stoll's r250 random number generator described in *Inner Loops* by Rick Booth. The speed improvement in our coding of the algorithm comes from using the floating point SIMD registers as 128-bit wide Boolean registers rather than as 4 single-precision floating point numbers. This procedure also sets up a pool of precomputed normal random numbers for later use.

function r250: Carray; register;

Using general purpose regs eax, ecx, edx, and SIMD reg xmm0, returns a pointer to four random cardinals at a time.

procedure r250norm4(nout: Sarray);

Returns four normals into destination array, using r250 to generate indices into precomputed pool of normal random numbers.

procedure r250normsvec(normdest: Sarray; normlen: integer);

Fills in single-precision normal vector where number of elements is multiple of four by randomly shuffling from a large pre-generated pool of normals.

procedure r250normdvec(normdest: Darray; normlen: integer);

Same as r250normsvec but in double precision.

procedure resetNormals;

Reset the random number generator to get reproducible streams of random numbers: using matched sets of random number to drive simulations with perturbed parameters is an important variance reduction technique for computing greeks accurately.

procedure tridiag(n: integer; a, b, c, work: Darray; x, y: Darray);

This procedure solves a tridiagonal system of linear equations. Tridiagonal systems are described by Golub and Van Loan, and also by Dahlquist and Bjorck.

procedure makeSpline(xin, yin: Darray; integer; n: Darray; spa: Darray);

Calculates coefficients for a natural cubic spline i.e., one that approximates function with cubic polynomials on each interval and has second derivatives at both endpoints equal to zero. Natural cubic splines are described in, e.g. *Numerical Methods*, by Dahlquist and Bjorck.

function evalSpline(spa: Darray; n: integer; argin: double): double;

Evaluates a natural cubic spline using coefficients computed by makeSpline.

procedure expVec(exparg, expres: Sarray; n: integer);

A vectorized, SIMDized Chebyshev expansion for the exponential with a maximum absolute error of 3e-7 on range [−1,1]. Vector length must be a multiple of eight. Between 10 and 30 times as fast as the built-in exponential function on Pentium III and Pentium 4 machines—greater relative speed improvements on faster processors.

procedure getZeros(zc: Darray;
gamma: Darray; mpr: Darray;//both r by c
ht: double;
steps: integer; bigd: Darray);

Computes a (non-deflated) zero-coupon bond price scenario under spot Libor measure using Glasserman & Zhao's "D" discretization. Key equations are ones involving "D" above in description of Libor Market Model.

We use a multivariate Brownian bridge to implement Jamshidian's equation 6.9, to make the evolution of the short bond price evolution more realistic. This approach is justified by Musiela & Rutkowski corollary 14.1.1 showing that one Brownian motion serves to adjust the bank account process to the reciprocal zero price process.

We also include a market price of risk parameter (not dealt with by Glasserman & Zhao, Jamshidian, or Musiela & Rutkowski) for "physical" simulation setting using the n-factor Cameron-Martin-Girsanov theorem as given in 6.3 of *Financial Calculus* by Baxter and Rennie.

procedure 1 mm init(seedVal: integer; n: integer; r: integer; c: integer; nzc: integer); stdcall;

This routine sets up the random number generator and allocates memory for vectors and matrices procedure get_noisy_zero_prices(zc: Darray; gamma: Darray; mpr: Darray;
ht: double;
steps: integer; bigd: Darray); stdcall;

This calls getZeros under the assumption that lmm_init has already been called.

Svd3.dll—Description
Source File: svd3.dpr

This DLL implements Golub and Reinsch's algorithm for Singular Value Decomposition of a matrix for use from APL. Our implementation handles only the case where the input m by n matrix has m>=n: this is sufficient for our application.

SWS4.DLL—Key Entry Points
file_exists—utility function for APL caller to determine whether a given file exists before trying to tie it;
open_scenarios_for_write—opens a "scenario file" (which actually consists of multiple physical files containing directory information and scenario values in single-precision floating point) for output;
get_ningroup—for an open scenario file, returns the number of scenarios in a group. This number is always a multiple of 128 so that a scenario group occupies an integral number of sectors on disk.
put_scenario_group—passes the data for a given scenario group to the writing thread (which uses the priority queue buffer method described above) and returns to the APL caller immediately so that scenario generation can continue.
close_scenarios_for_write—flushes the priority queue buffer and closes the scenario file.
open_scenarios_for_read—opens a scenario file for reading.
get_nscen—for an open scenario file, returns number of scenarios in the file.
get_scenario—for an open scenario file, gets all the scenario values for a given series (i.e., fund, hedging instrument, or discount factor) at a given epoch (future time) in double precision for an APL caller.
get_scenario_single—same as get_scenario but uses single precision for a Delphi (compiled) caller.
get_scenario_offset_length_single—same as get_scenario_single but allows the caller to obtain a subset of the scenarios—this entry is used by the "strip-mining" projection modes implemented in the dynproj DLL.
get_scenario_offset_length_index—same as get_scenario_offset_length_single but allows the caller to specify a file handle index—this entry is used by the multi-threaded "strip-mining" projection mode implemented in the dynproj DLL.
get_scenario_block—gets scenario values for a block (a set of epochs one quarter apart) for a given series in double precision for an APL caller. To the extent possible, a block is stored contiguously on disk.
get_scenario_block_single—same as get_scenario_block but returns values in single precision for a Delphi (compiled) caller.
preread_scenario_block—initiates a read of a scenario block into the cache and returns immediately without waiting for the values.
close_scenariosfor_read—closes a scenario file that was opened for read.

Dynproj DLL—Description and Key Entry Points
The DLL is multithreaded, so that it can make use of multiple CPU's and overlap I/O and computation. The DLL is compiled in either single or double-precision mode depending on the value of projectionMode selected by the user. Many of the utility routines used in the DLL have single- and double-precision versions: generally speaking, the double-precision version is slower but easier to read, while the single-precision version is optimized and so is faster (sometimes_much_faster) but more complicated.

Memory Allocator—Memory allocation is often a bottleneck in application programs, and this problem can be exacerbated if multiple threads share a common memory pool. Additionally, many of the SIMD (Single Instruction Multiple Data) instructions used for fast vectorized operations require that their arguments be aligned on 16-byte boundaries (i.e., be located at memory addresses ending with a zero in hexadecimal): the standard memory allocator in Delphi (or APL or C++, for that matter) does not guarantee such alignment.

To deal with these issues we use a "zone" allocator, which requests memory from the operating system in fairly large chunks (currently 16 Mb at a time) and then parcels it out to the rest of the application as needed.

Memory is classified in three categories:
1) Permanent: this is mostly write-once data (data not modified after initialization), such as assumptions, that can safely be shared between threads. In this context "permanent" means for the duration of the processing of a scenario set, i.e., the application of one possibly perturbed set of (say) 3072 scenarios to the inforce file.
2) Temporary: this is memory that is allocated for the duration of the processing of a specific policy, and is freed at the end of processing for that policy.
3) Volatile: this is memory that is allocated for the duration of the processing of a specific transaction, and is freed at the end of the processing for that transaction. This may include multiple procedure calls if inheritance comes into play (e.g. processing a partial withdrawal for a combo consisting of a product with a rider may involve processing it for the product, the rider, and the combo).

Memory in categories 2 and 3 is allocated per thread.
(A similar approach, but with a more stringent allocation alignment requirement of 512 byte boundaries for sector alignment, is used in sws4.dll).

Hash tables—we use hash tables to maintain the mapping between a variable name in an assumption record or instance variable record (i.e., the APL view of it) and its offset and type (i.e., the compiled Delphi code view of it). Hash tables are dealt with in a number of standard texts, such as *Data Structure Techniques* by Thomas A. Standish. The method we use is referred to as "separate chaining". The hashing method used (universal hashing) is described in *Introduction to Algorithms* by Thomas H. Cormen, Charles E. Leiserson, and Ronald L. Rivest.

Inline Assembler—Some of the functions in dynproj use inline assembler for speed and/or access to the SIMD instruction set. A good (although dated) source for assembler programming on 32-bit Intel processors is the 80386 *Programmer's Reference Manual*, by Intel Corporation. Many of the assembler routines are for vector processing and use the Intel SIMD (Single Instruction, Multiple Data) instructions.

Key entry points to the DLL are:

is_debug—returns true if the caller's command line argument contained the string "vadebug"—this is used to avoid attempting to recompile the DLL while debugging it.

set_xact_cycle—this sets the cyclic order in which to perform transactions (currently we start with xRunTo and end with xCalcDecrs).

is_combo_impl—given an integer vector combo code, returns true if there is a Delphi implementation for the combo in the DLL.

get_impl_combo_size—returns number of rows and columns for the matrix defining all implemented combos.

get_impl_combos—returns the matrix defining all implemented combos.

get_inst_type—given an integer vector combo code, the combo component name (which currently must be in the set "policy", "riderA", "riderB", "riderC", or "riderD") and the instance variable name, return its type.

get_assn_type—given an integer vector combo code, the combo component name (which currently must be in the set "policy", "riderA", "riderB", "riderC", "riderD", or "global") and the assumption variable name, return its type.

alloc_combo—allocates memory for a combo and returns a handle to it.

alloc_combo_slot—allocates memory for a combo in a specific slot and returns a handle to it. Slots correspond to available memory pools and are used to overlap DLL computational threads with APL processing for multithreaded processing.

get_this_inst_type—given a combo handle, the combo component name (which currently must be in the set "policy", "riderA", "riderB", "riderC", or "riderD") and the instance variable name, return its type.

free_combo—frees memory associated with a combo handle.

set_inst_dmat—sets the discount matrix for a combo.

set_inst_numeric_value—sets a numeric value (Boolean, integer, or floating point) for a combo component's instance variables given the combo handle, combo component name, and instance variable name.

set_inst_string_value—sets a string value for a combo component's instance variables given the combo handle, combo component name, and instance variable name.

set_inst jul_date_value—sets a date value for a combo component's instance variables given the combo handle, combo component name, instance variable name, and the date in Julian date format.

set_inst_greg_date_value—sets a date value for a combo component's instance variables given the combo handle, combo component name, instance variable name, and the date in Gregorian date format.

set_inst jul_date_vec_value—sets a date vector for a combo component's instance variables given the combo handle, combo component name, instance variable name, and the date vector in Julian date format.

set_inst_greg_date_vec_value—sets a date vector for a combo component's instance variables given the combo handle, combo component name, instance variable name, and the date vector in Gregorian date format.

set_inst_vector_value—sets a numeric vector for a combo component's instance variables given the combo handle, combo component name, and instance variable name.

set_inst_matrix_value—sets a numeric matrix for a combo component's instance variables given the combo handle, combo component name, and instance variable name.

Note: there are also corresponding "get_" functions to go the other way (retrieve a value from the DLL into the APL workspace).

set_named_integer_vector—sets vectors of indices used to identify the classes of series within the scenarios, which are discount factor indices, equity hedging instrument indices, fund unit value indices, and interest hedging instrument indices.

setup_power_tables—precomputes tables of fractional powers to minimize the number of calls to transcendental functions.

are_combo_assns_set—returns true if assumptions for a specific combo have been marked as set. This result is used to avoid resetting assumptions that another computational thread might be using.

mark_combo_assns_set—mark assumptions for a specific combo as set.

set_assn_numeric_value—sets a numeric value (Boolean, integer, or floating point) for a combo's assumption variables given the integer vector combo code, the combo component name, and the assumption variable name.

set_assn_string_value—sets a string value for a combo's assumption variables given the integer vector combo code, combo component name, and assumption variable name.

set_assn jul_date_value—sets a date value for a combo's assumption variables given the integer vector combo code, combo component name, assumption variable name, and the date in Julian date format.

set_assn_greg_date_value—sets a date value for a combo's assumption variables given the integer vector combo code, combo component name, assumption variable name, and the date in Gregorian date format.

set_assn jul_date_vec_value—sets a date vector for a combo's assumption variables given the integer vector combo code, combo component name, assumption variable name, and the date vector in Julian date format.

set_assn_greg_date_vec_value—sets a date vector a combo's assumption variables given the integer vector combo code, combo component name, assumption variable name, and the date vector in Gregorian date format.

set_assn_vector_value—sets a numeric vector for a combo's assumption variables given the integer vector combo code, combo component name, and assumption variable name.

set_assn_matrix_value—sets a numeric matrix for a combo's assumption variables given the integer vector combo code, combo component name, and assumption variable name.

Note: there are also corresponding "get_" functions to go the other way (retrieve a value from the DLL into the APL workspace).

load_scenario_dll—loads the scatter-write scenario DLL (current version SWS4) given its name. This approach is used to ensure that the APL workspace and the dynproj DLL share the same copy of the scatter-write scenario DLL.

do_xact—perform a transaction on an allocated combo given its handle, the name of the transaction, and the arguments to the transaction.

do_xact_cycle—perform a whole cycle of transactions on an allocated combo given its handle.

do_stripmined_xact_cycle—perform a whole cycle of transactions on an allocated combo given its handle using a stripmining approach. For example, if the number of scenarios is 3072 and the strip size is 256, then we have 3072/256=12 strips: we perform the entire transaction cycle out to the processing horizon for the first 256 elements of each instance variable vector, then for the next 256, and so on. This approach has better cache locality than working with the full-length vectors and runs about twice as fast.

do_unwound_xact_cycle—same as do_stripmined_xact_cycle but uses "unwound" (nonrecursive) method resolution.

start_threadproc—detects whether running on a dual-CPU machine, and if so starts computational threads for dual-CPU processing. Depending on the version of Windows it may be necessary to turn off something that Microsoft calls "dynamic thread priority boosting", which turns out to have a detrimental impact on overall performance by causing priority inversions.

do_dual_unwound_xact_cycle—same as do_unwound_xact_cycle, but processes half the strips on CPU 0 concurrently with processing the other half of the strips on CPU 1.

start_cycle_on_slot—starts the transaction processing cycle on one slot and immediately returns to APL to start on the construction of the next combo in the other slot.

slot_is_active—returns true if processing is currently occurring on a given slot.

finish_cycle_on_slot—waits until computation for a slot is finished and returns present value.

end_thread_proc—terminates computational threads.

get_proj_jiffies—returns profile counters for selected sections of Delphi cash flow projection code—used for performance tuning.

reset_assns—frees all memory used to store assumptions. Called at the end of processing for a scenario set.

PTIDL2 DLL—Description and Key Entry Points

The name stands for Process Templates, Invoke Delphi, Load. This DLL merges templates for instance variable records with instance variable files created by APL, and also merges transaction method templates with transaction-handling source code. The merged files are included in the dynproj dll. The templates contain repetitive code used to set up the correspondence between APL's view of instance variables (a nested vector of fields accessible by name) and Delphi's view (hash tables associating instance variable names with types and offsets in the instance variable records).

Once the files are created we use the CreateProcess system call to run the Delphi command-line compiler under the control of the ptidl dll, with the compiler output redirected to file rather than to the screen. This allows us to compile the dynproj dll under the control of the APL workspace, since the calling program can check for compilation errors rather than asking the user to do it. We also have a couple of small utility functions for loading and unloading DLL's to provide functionality that the APL DLL interface lacks.

The CreateProcess system call is documented in Microsoft's Win32 Online Help and in Win32 System Programming (2nd ed) by Johnson M. Hart. It allows one process (e.g., a running APL session) to start another process (i.e., the Delphi command-line compiler) with (optionally) output redirected to files.

Entry points to the DLL are:

build_assns—builds assumption records from assumption templates and APL-generated assumption variable files;

build_records—builds instance variable records from instance variable templates and APL-generated instance variable files;

build handlers—builds transaction handler functions (methods) from handler templates and handler source files;

compile_all—invokes the Delphi compiler on the generated files and the dynproj source file;

compile_msgs—returns compilation messages (hints, warnings, and errors) resulting from compile_all to caller as a character matrix;

load_DLL—loads a specified DLL using a specified path for the caller—this is more general than the APL DLL interface since it allows a path to be specified.

unload_DLL—unloads a specified DLL for the caller—the APL DLL interface has no analogous routine.

SIMD Vector Utility Declarations

The SIMD vector utilities are contained in the file vector.pas. They use the overload directive to allow for different numbers of operands and to allow the same projection source code to be used for both single and double precision projection.

function vadd(const targ: doubleVec; const src1: doubleVec; const src2: doubleVec): doubleVec; register; overload;
function vadd(const targ: singleVec; const src1: singleVec; const src2: singleVec): singleVec; register; overload;
function vadd(const targ: doubleVec; const src1: doubleVec; const src2: doubleVec;
    const src3: doubleVec): doubleVec; register; overload;
function vadd(const targ: singleVec; const src1: singleVec; const src2: singleVec;
    const src3: singleVec): singleVec; register; overload;
function vadd(const targ: doubleVec; const src1: doubleVec; const src2: doubleVec;
    const src3: doubleVec; const src4: doubleVec): doubleVec; register; overload;
function vadd(const targ: singleVec; const src1: singleVec; const src2: singleVec;
    const src3: singleVec; const src4: singleVec): singleVec; register; overload;
function vadd(const targ: doubleVec; const src1: doubleVec; const src2: doubleVec;
    const src3: doubleVec; const src4: doubleVec; const src5: doubleVec): doubleVec; register; overload;
function vadd(const targ: singleVec; const src1: singleVec; const src2: singleVec;
    const src3: singleVec; const src4: singleVec; const src5: singleVec): singleVec; register; overload;
function vsub(const targ: doubleVec; const src1: doubleVec; const src2: doubleVec): doubleVec; register; overload;
function vsub(const targ: singleVec; const src1: singleVec; const src2: singleVec): singleVec; register; overload;
function vmult(const targ: doubleVec; const src1: doubleVec; const src2: doubleVec): doubleVec; register; overload;
function vmult(const targ: singleVec; const src1: singleVec; const src2: singleVec): singleVec; register; overload;
function vmult(const targ: doubleVec; const src1: doubleVec; const src2: doubleVec;
    const src3: doublevec): doubleVec; register; overload;
function vmult(const targ: singleVec; const src1: singleVec; const src2: singleVec;
    const src3: singleVec): singleVec; register; overload;
function vmax(const targ: doubleVec; const src1: doubleVec; const src2: doubleVec): doubleVec; register; overload;
function vmax(corist targ: singleVec; const src1: singleVec; const src2: singleVec): singleVec; register; overload;
function vmin(const targ: doubleVec; const src1: doubleVec; const src2: doubleVec): doubleVec; register; overload;
function vmin(const targ: singleVec; const src1: singleVec; const src2: singleVec): singleVec; register; overload;
function vrecip(const targ: doubleVec; const src1: doubleVec): doubleVec; register; overload;

function vrecip(const targ: singleVec; const src1: singleVec): singleVec; register; overload;
function vcopy(const targ: doubleVec; const src1: doubleVec): doubleVec; register; overload;
function vcopy(const targ: singleVec; const src1: singleVec): singleVec; register; overload;
function vsset(const targ: doubleVec; const scalar: double): doubleVec; register; overload;
function vsset(const targ: singleVec; const scalar: single): singleVec; register; overload;
function vsset(const targ: booleanVec; const scalar: Boolean): booleanVec; register; overload;
function vsadd(const targ: doubleVec; const src1: doubleVec; const scalar: double): doubleVec; register; overload;
function vsadd(const targ: singleVec; const src1: singleVec; const scalar: single): singleVec; register; overload;
function vsmult(const targ: doubleVec; const src1: doubleVec; const scalar: double): doubleVec; register; overload;
function vsmult(const targ: singleVec; const src1: singleVec; const scalar: single): singleVec; register; overload;
function vsmax(const targ: doubleVec; const src1: doubleVec; const scalar: double): doubleVec; register; overload;
function vsmax(const targ: singleVec; const src1: singleVec; const scalar: single): singleVec; register; overload;
function vsmin(const targ: doubleVec; const src1: doubleVec; const scalar: double): doubleVec; register; overload;
function vsmin(const targ: singleVec; const src1: singleVec; const scalar: single): singleVec; register; overload;
function vnzmask(targ: doubleVec; src1: doubleVec): doubleVec; register; overload; function vnzmask(const targ: singleVec; const src1: singleVec): singleVec; register; overload.

In a preferred embodiment, the method of the invention is implemented by a specially programmed general purpose computer. The steps of the method are implemented by an arithmetic logic unit of the computer with data stored in short term (RAM) and long term memory. In the apparatus claim the means plus function language is intended to comprise the arithmetic logic unit of the computer together with memory.

Thus it is seen that the objects of the invention are efficiently obtained, although modifications and changes to the invention should be readily obvious to those having ordinary skill in the art, and these modifications are intended to be within the scope of the claims.

What is claimed is:

1. A computer-based method for generating a program for hedging the guaranteed benefits of a set of variable annuity (VA) contracts, comprising:

storing computer readable instructions in a memory element of a computer; and executing, using a processor for the computer, the computer readable instructions to:

receive a user-selected projection mode from a plurality of projection modes, the plurality of projection modes including at least five projection modes, wherein a respective speed of execution and a respective detail of reporting is associated with each projection mode and the respective speeds of execution and the respective details of reporting vary by projection mode;

receive a user selection of a plurality of hedging instruments;

automatically generate interpreted and compiled code according to the user-selected projection mode;

generate fund coefficient data summarizing expected changes in the variable annuity funds as a function of changes in values of the user-selected hedging instruments using regression and cointegration analysis of the variable annuity funds and the plurality of user-selected hedging instruments;

simulate a plurality of first time series for interest rates using the Libor Market Model, wherein each first time series is a function of time for a respective perturbation of a yield curve;

simulate a plurality of second time series for fund unit values for a variable annuity contract using the plurality of first time series to supply interest rate data for the second series, wherein each second time series is a respective function of time for a respective perturbation of fund unit values;

simulate a plurality of third time series for equity index values for a variable annuity contract using the plurality of first time series to supply interest rate data for the third series, wherein each third time series is a respective function of time for a respective perturbation of equity index values;

generate, vectorized integrated scenario sets, wherein each vectorized integrated scenario set includes a respective first time series, a respective second time series, and a respective third time series;

arrange scenario data for the vectorized integrated scenario sets on computer hard disk and in RAM;

consecutively arrange, for respective scenario data for the first, second, and third time series for the vectorized integrated scenario set, record offsets on computer hard disk and addresses in RAM;

calculate a present value of a respective first projected cash flow for said each variable annuity contract for said each vectorized integrated scenario set according to the user-selected prosection mode with computation optionally distributed across a user-selectable set of servers, using multi-threaded vectorized calculation for each variable annuity contract for each vectorized integrated scenario set, wherein vectorized calculation includes working with values for a plurality of simulated policies, and wherein each respective first projected cash flow is a projected variable annuity benefit guarantee cash flow;

perform thread-safe caching of a portion of said each vectorized integrated scenario set, wherein at least two threads are able to access the cache simultaneously and to access all or part of a scenario record;

calculate differences of the present values of the respective first projected cash flows;

calculate, using the differences of the present values of the respective first projected cash flow, sensitivities to financial parameters for said each variable annuity contract, wherein the sensitivities to financial parameters are selected from the group consisting of a delta, a gamma, a rho, a vega, and a theta;

calculate differences of present values of respective projected second cash flows for each hedging instrument from the plurality of hedging instruments for each vectorized integrated scenario set;

determine sensitivities, using the differences of present values of respective projected second cash flows, to financial parameters for each hedging instrument from the plurality of hedging instruments, wherein the sensitivities to financial parameters are selected from the group consisting of a delta, a gamma, a rho, a vega, and a theta, wherein:

delta=$\delta V/\delta S$;

gamma=$\delta^2 V/\delta S^2$;

rho=$\delta V/\delta r$;

vega=$\delta V/\delta\sigma$;

theta=$\delta V/\delta t$; and,

V is a present value of a cash flow, S is a value of a hedging instrument, r is an initial interest rate in a yield curve, σ is volatility of a hedging instrument, and t is time; and, generate an output including at least one file with comma separated values for the determined sensitivities.

2. The computer-based method of claim 1, wherein generating vectorized integrated scenario sets includes using respective processors for a plurality of specially programmed computers to minimize network traffic and to minimize latency of access to the scenario data.

3. The computer-based method of claim 1, wherein multi-threaded vectorized calculation includes using respective processors for a plurality of specially programmed computers to minimize network traffic and to minimize latency of access to the scenario data.

4. A general purpose computer specially programmed to generate a program for hedging guaranteed benefits of a set of variable annuity (VA) contracts, comprising:

a memory element storing computer readable instructions; and a processor configured to access the computer readable instructions in the memory element, to execute the computer readable instructions, and to operate a graphical user interface for the computer, wherein:

the graphical user interface is configured to:

receive a user-selected projection mode from a plurality of projection modes, the plurality of projection modes including at least five projection modes; and receive a user selection of a plurality of hedging instruments; and the processor is configured to execute the computer readable instructions to:

automatically generate interpreted and compiled code according to the user-selected projection mode, wherein each user-selected mode determines a respective execution speed of the code;

generate fund coefficient data summarizing expected changes in the variable annuity funds as a function of changes in values of the user-selected hedging instruments using regression and cointegration analysis of the variable annuity funds and the plurality of user-selected hedging instruments;

simulate a plurality of first time series for interest rates using the Libor Market Model, wherein each first time series is a function of time for a respective perturbation of a yield curve;

simulate a plurality of second time series for fund unit values for a variable annuity contract using the plurality of first time series to supply interest rate data for the second series, wherein each second time series is a respective function of time for a respective perturbation of fund unit values;

simulate a plurality of third time series for equity index values for a variable annuity contract using the plurality of first time series to supply interest rate data for the third series, wherein each third time series is a respective function of time for a respective perturbation of equity index values;

generate vectorized integrated scenario sets, wherein each vectorized integrated scenario set includes a respective first time series, a respective second time series, and a respective third time series;

arrange scenario data for the vectorized integrated scenario sets on computer hard disk and in RAM;

consecutively arrange, for respective scenario data for the first, second, and third time series for the vectorized integrated scenario set, record offsets on computer hard disk and addresses in RAM;

calculate a present value of a respective first projected cash flow for said each variable annuity contract for said each vectorized integrated scenario set according to the user-selected projection mode with computation optionally distributed across a user-selectable set of servers, using multi-threaded vectorized calculation for each variable annuity contract for each vectorized integrated scenario set, wherein vectorized calculation includes working with values for a plurality of simulated policies, and wherein each respective first projected cash flow is a projected variable annuity benefit guarantee cash flow;

perform thread-safe caching of a portion of said each vectorized integrated scenario set, wherein at least two threads are able to access the cache simultaneously and to access all or part of a scenario record;

calculate differences of the present values of the respective first projected cash flow;

calculate, using the differences of the present values of the respective first projected cash flow, sensitivities to financial parameters for said each variable annuity contract, wherein the sensitivities to financial parameters are selected from the group consisting of a delta, a gamma, a rho, a vega, and a theta;

calculate differences of present values of respective projected second cash flows for each hedging instrument from the plurality of hedging instruments for each vectorized integrated scenario set;

determine sensitivities, using the differences of present values of respective projected second cash flows, to financial parameters for each hedging instrument from the plurality of hedging instruments, wherein the sensitivities to financial parameters are selected from the group consisting of a delta, a gamma, a rho, a vega, and a theta, wherein:

delta=$\delta V/\delta S$;

gamma=$\delta^2 V/\delta S^2$;

rho=$\delta V/\delta r$;

vega=$\delta V/\delta\sigma$;

theta=$\delta V/\delta t$; and,

V is a present value of a cash flow, S is a value of a hedging instrument, r is an initial interest rate in a yield curve, σ is volatility of a hedging instrument, and t is time; and generate an output including at least one file with comma separated values for the determined sensitivities.

* * * * *